US010212543B2

(12) United States Patent
Enriquez et al.

(10) Patent No.: US 10,212,543 B2
(45) Date of Patent: *Feb. 19, 2019

(54) IN-VEHICLE ACCESS APPLICATION

(71) Applicant: Visa International Service Association, San Francisco, CA (US)

(72) Inventors: Martin Enriquez, Foster City, CA (US); Kelvan Howard, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,536

(22) Filed: Jun. 1, 2017

(65) Prior Publication Data
US 2017/0272905 A1 Sep. 21, 2017

Related U.S. Application Data

(63) Continuation of application No. 14/932,665, filed on Nov. 4, 2015, now Pat. No. 9,706,354.

(51) Int. Cl.
*H04W 4/021* (2018.01)
*G06Q 20/40* (2012.01)
(Continued)

(52) U.S. Cl.
CPC ........ *H04W 4/021* (2013.01); *G01C 21/3461* (2013.01); *G06Q 20/085* (2013.01); *G06Q 20/40145* (2013.01); *G07B 15/063* (2013.01); *G08G 1/01* (2013.01); *G08G 1/017* (2013.01); *G08G 1/207* (2013.01); *H04L 67/12* (2013.01); *H04L 67/141* (2013.01); *H04L 67/18* (2013.01); *H04W 4/44* (2018.02);
*H04W 4/48* (2018.02); *G07B 15/02* (2013.01); *H04L 63/08* (2013.01); *H04L 67/20* (2013.01); *H04L 69/18* (2013.01);
(Continued)

(58) Field of Classification Search
USPC ........................................................ 701/300
See application file for complete search history.

(56) References Cited

U.S. PATENT DOCUMENTS 4,303,904 A  12/1981  Chasek
5,663,548 A   9/1997  Hayashi et al.
(Continued)

FOREIGN PATENT DOCUMENTS

JP     2011 118691 A      6/2011

OTHER PUBLICATIONS

International Search Report / Written Opinion dated Feb. 17, 2017 in PCT Application No. PCT/US2016/060102, 10 pages.
(Continued)

*Primary Examiner* — Tyler D Paige
(74) *Attorney, Agent, or Firm* — Kilpatrick Townsend & Stockton LLP

(57) ABSTRACT

An in-vehicle access application may have different modes of operation. The different modes of operation may allow the in-vehicle access application to interact with different access devices, or interact differently with an access device. When a vehicle is determined to be in a stopped position, a first mode of operation of the in-vehicle access application can be activated. When a vehicle is determined to be moving, a second mode of operation of the in-vehicle access application can be activated.

20 Claims, 14 Drawing Sheets

(51) Int. Cl.

| | | |
|---|---|---|
| G01C 21/34 | (2006.01) | |
| G06Q 20/08 | (2012.01) | |
| G08G 1/01 | (2006.01) | |
| H04L 29/08 | (2006.01) | |
| G08G 1/017 | (2006.01) | |
| G08G 1/00 | (2006.01) | |
| G07B 15/06 | (2011.01) | |
| H04W 4/44 | (2018.01) | |
| H04W 4/48 | (2018.01) | |
| G07B 15/02 | (2011.01) | |
| H04W 4/02 | (2018.01) | |
| H04L 29/06 | (2006.01) | |
| H04W 12/06 | (2009.01) | |
| H04W 52/02 | (2009.01) | |
| H04W 72/02 | (2009.01) | |
| H04W 4/80 | (2018.01) | |

(52) U.S. Cl.
CPC .......... *H04L 69/28* (2013.01); *H04W 4/023* (2013.01); *H04W 4/80* (2018.02); *H04W 12/06* (2013.01); *H04W 52/0254* (2013.01); *H04W 72/02* (2013.01)

(56) References Cited

U.S. PATENT DOCUMENTS

| | | | |
|---|---|---|---|
| 6,366,220 B1 | 4/2002 | Elliott | |
| 6,574,603 B1 | 6/2003 | Dickson et al. | |
| 6,653,946 B1 | 11/2003 | Hassett | |
| 8,407,144 B2 | 3/2013 | Roberts et al. | |
| 8,874,653 B2 | 10/2014 | Chang | |
| 9,706,354 B2 * | 7/2017 | Enriquez | G06Q 20/40145 |
| 9,868,389 B2 * | 1/2018 | Williams | B60Q 1/50 |
| 2002/0145542 A1 | 10/2002 | Hiroshi | |
| 2003/0110075 A1 | 6/2003 | Shioda et al. | |
| 2004/0143737 A1 | 7/2004 | Teicher | |
| 2004/0230480 A1 | 11/2004 | Kanayama | |
| 2005/0086100 A1 * | 4/2005 | Yanagisawa | G01C 21/26 705/13 |
| 2006/0109085 A1 | 5/2006 | Tiernay et al. | |
| 2008/0208680 A1 | 8/2008 | Cho | |
| 2009/0024525 A1 | 1/2009 | Blumer et al. | |
| 2010/0057624 A1 | 3/2010 | Hurt et al. | |
| 2010/0085213 A1 | 4/2010 | Turnock et al. | |
| 2010/0280956 A1 | 11/2010 | Chutorash et al. | |
| 2011/0004370 A1 * | 1/2011 | Nagase | G08G 1/01 701/33.4 |
| 2011/0047009 A1 | 2/2011 | Deitiker et al. | |
| 2011/0136429 A1 | 6/2011 | Ames et al. | |
| 2011/0137773 A1 * | 6/2011 | Davis, III | G01G 19/4142 705/34 |
| 2011/0258076 A1 | 10/2011 | Muirbrook | |
| 2012/0215403 A1 * | 8/2012 | Tengler | B60W 50/12 701/36 |
| 2012/0323690 A1 | 12/2012 | Michael | |
| 2013/0030882 A1 * | 1/2013 | Davis, III | G01G 19/4142 705/13 |
| 2014/0025444 A1 | 1/2014 | Willis | |
| 2014/0058805 A1 | 2/2014 | Paesler | |
| 2014/0074566 A1 | 3/2014 | McCoy et al. | |
| 2014/0081848 A1 | 3/2014 | Leopold et al. | |
| 2014/0114778 A1 | 4/2014 | Miller et al. | |
| 2014/0131432 A1 | 5/2014 | Chang | |
| 2014/0136329 A1 | 5/2014 | Chang | |
| 2014/0188579 A1 | 7/2014 | Regan, III et al. | |
| 2014/0236462 A1 * | 8/2014 | Healey | G08G 1/0962 701/117 |
| 2014/0309864 A1 | 10/2014 | Ricci | |
| 2015/0058224 A1 | 2/2015 | Gaddam et al. | |
| 2015/0081403 A1 | 3/2015 | Gravelle et al. | |
| 2015/0135336 A1 | 5/2015 | Arasavelli | |
| 2015/0221140 A1 | 8/2015 | Eid | |
| 2016/0042575 A1 | 2/2016 | Ganguly | |
| 2016/0203651 A1 | 7/2016 | Heath | |
| 2016/0247143 A1 | 8/2016 | Ghosh | |
| 2017/0127230 A1 * | 5/2017 | Enriquez | G06Q 20/40145 |

OTHER PUBLICATIONS

Supplementary European Search Report, dated Aug. 23, 2018, in EP Application No. 16862868.3, 12 pages.

* cited by examiner

IN-VEHICLE ACCESS APPLICATION

CROSS-REFERENCES TO RELATED APPLICATIONS

This application is a continuation of U.S. patent application Ser. No. 14/932,665 filed Nov. 4, 2015, which is herein incorporated by reference in its entirety for all purposes.

BACKGROUND

In-vehicle computing systems such as a vehicle's infotainment system may allow an occupant of the vehicle to listen to the radio, watch a video, access the vehicle's climate controls, or obtain navigation assistance, etc. However, beyond these basic functionalities, a vehicle's infotainment system may have limited capabilities to interact with external devices to obtain other services. For example, a vehicle infotainment system may have limited capabilities to interact with an access device to exchange information.

Embodiments of the present invention address these and other problems, individually and collectively.

BRIEF SUMMARY

According to some embodiments, an in-vehicle computing system may include a user interface, a processor, and a memory coupled to the processor. The memory may store a set of computer executable instructions including an in-vehicle access application that has a proximity mode of operation and a tolling mode of operation. The in-vehicle computing system can receive a vehicle status signal from a vehicle communication bus. Based on a first state of the vehicle status signal at a first point in time, the in-vehicle computing system may determine that the vehicle is in a stopped position. Responsive to determining that the vehicle is in the stopped position, the proximity mode of operation of the in-vehicle access application can be activated. Based on a second state of the vehicle status signal at a second point in time, the in-vehicle computing system may determine that the vehicle is moving. Responsive to determining that the vehicle is moving, the tolling mode of operation of the in-vehicle access application can be activated.

According to some embodiments, a method involving an in-vehicle access application may include receiving a vehicle status signal from a vehicle communication bus. The method may further include determining that the vehicle is in a stopped position based on a first state of the vehicle status signal at a first point in time. Responsive to determining that the vehicle is in the stopped position, the method may activate the proximity mode of operation of the in-vehicle access application. The method may also include determining that the vehicle is moving based on a second state of the vehicle status signal at a second point in time. Responsive to determining that the vehicle is moving, the method may activate the tolling mode of operation of the in-vehicle access application.

DETAILED DESCRIPTION

Figure 1:
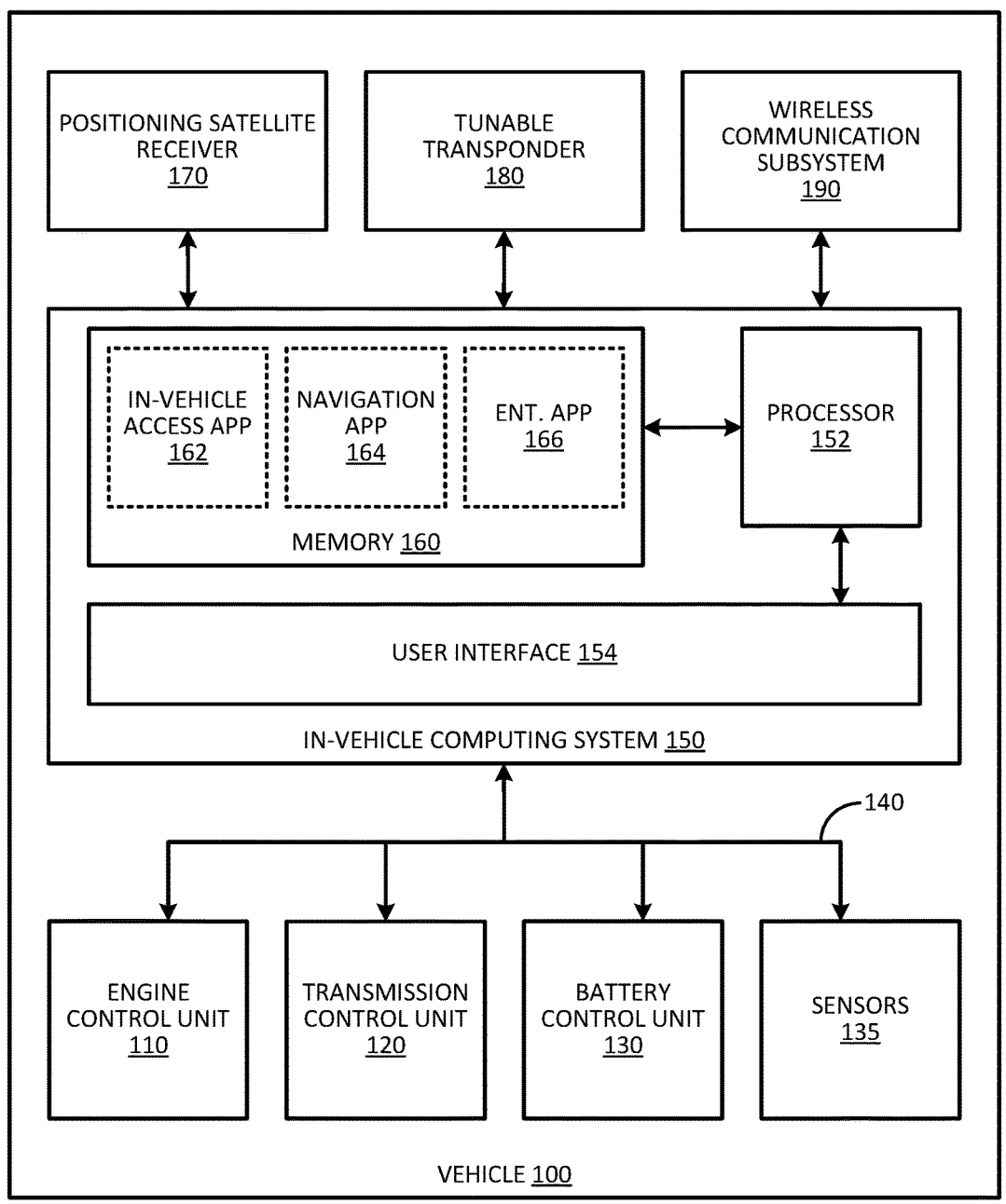
FIG. 1 illustrates a block diagram of various electronic components of a vehicle, according to some embodiments.

Embodiments of the present invention provide techniques for an in-vehicle computing system to communicate and exchange information with external devices such as access devices. An in-vehicle access application can be installed on the in-vehicle computing system. The in-vehicle computing system may monitor the state of the vehicle. Depending on the state of the vehicle, the in-vehicle access application can be activated into different modes of operation. The different modes of operation may allow the in-vehicle computing system to interact with different types of access devices or interact with an access device in a different manner to provide the vehicle and/or an occupant of the vehicle with different services.

Prior to discussing the details of some embodiments of the present invention, description of some terms may be helpful in understanding the various embodiments.

A "computing device" may be a device that includes one or more electronic components (e.g., an integrated chip) that can communicate with another device. For example, a computing device can be a communication device that includes at least one processor coupled to a memory that stores instructions or code for execution by the processor. A "portable computing device" can be a computing device that can be transported and operated by a user. A portable computing device may provide remote communication capabilities to a network. A portable computing device can be configured to transmit and receive data or communications to and from other devices. A portable computing device may be in the form of a mobile device such as a mobile phone (e.g., smart phone, cellular phone, etc.), tablets, portable media player, personal digital assistant devices (PDAs), wearable computing device (e.g., watch), health monitoring device, electronic reader device, etc., or in the form of a card (e.g., smart card) or a fob, etc. Examples of portable computing devices may also include portable computers (e.g., laptops, netbooks, ultrabooks, etc.). A portable computing device may also be in the form of a vehicle (e.g., an automobile, a motorcycle, a boat, an aircraft, etc.), or be integrated as part of a vehicle (e.g., an in-vehicle computing system).

An "in-vehicle computing system" may refer to a computing system integrated into part of a vehicle. Examples of an in-vehicle computing system may include a vehicle's infosystem, infotainment system, or other in-vehicle system that allows an occupant such as the driver or passenger (may also be referred to as a user, operator, or consumer) of the vehicle to interact with the functionalities of a vehicle. An in-vehicle computing system can typically be configured at the center console of a vehicle to allow an occupant easy access to the in-vehicle computing system.

A "server" or "server computer" may include a powerful computer or cluster of computers. For example, the server computer can be a large mainframe, a minicomputer cluster, or a group of servers functioning as a unit, and may include one or more processors coupled to one or more memories storing executable code. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be a suitable device for communicating with a merchant computer or transaction processing network, and for interacting with a computing device, a payment device, a user computer apparatus, and/or a user mobile device. An access device may generally be located in any suitable location, such as at the location of a merchant. An access device may be in any suitable form. Some examples of access devices include point-of-sale (POS) devices or terminals, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable computing device. In some embodiments, where an access device may comprise a POS terminal, any suitable POS terminal may be used and may include a reader, a processor, and a memory or computer-readable medium. A reader may include any suitable contact or contactless mode of operation. For example, exemplary readers can include radio frequency (RF) antennas, optical scanners, bar code readers, or magnetic stripe readers to interact with a portable computing device. An access device can also be in the form of or integrated into a toll station or toll gate, a remote tolling server, a drive-thru station, a parking meter or facility, a refueling station, etc.

An "authorization request message" may be an electronic message that is sent to request authorization for a transaction. The authorization request message can be sent to a transaction processing network and/or an issuer of a transaction account. An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant computer that indicates approval of the transaction. The code may serve as proof of authorization. As noted above, in some embodiments, a transaction processing network may generate or forward the authorization response message to the merchant.

A "token" may include a substitute identifier for some information. For example, a transaction token such as a payment token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with a transaction account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

An "account parameter" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services. In some embodiments, a merchant may include a tolling authority, a refuel station, a parking facility, a drive-thru restaurant, etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

A "transaction processing network" may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Details of some embodiments of the present invention will now be described.

I. Vehicle System and in-Vehicle Access Application Overview

FIG. 1 illustrates a block diagram of a vehicle 100, according to some embodiments. Vehicle 100 can be powered by a gasoline engine, an electric or hybrid-electric engine, a fuel cell, or other types of motor engines or energy sources. Although vehicle 100 may be described as an automobile, it should be understood that in some embodiments, the techniques described herein can also be applied to other types of vehicles such as motorcycles, boats, aircrafts, or other types of powered machines that are used to transport an occupant from one location to another.

Vehicle 100 may include various electronic control units (ECUs) to operate and control the electrical system or other subsystems of vehicle 100, and may include sensors 135 that the ECUs can monitor. Each ECU may include a microcontroller and one or more memories (e.g., any combination of SRAM, EEPROM, Flash memories, etc.) to store one or more executable programs for the ECU. Examples of ECUs may include engine control unit 110, transmission control unit 120, and battery control unit 130, etc. In some embodiments, vehicle 100 may include additional ECU(s) not specifically shown, omit one or more ECUs, and/or integrate any of the functionalities of different ECUs into a single ECU.

Engine control unit 110 may control the actuators, valves, motor, and other components of the engine of vehicle 100. Transmission control unit 120 may control the gear shifting and the transmission modes (e.g., park, drive, neutral, reverse) of vehicle 100. Battery control unit 130 may control the electrical voltage and current supplied by a battery to the various components of vehicle 100. Sensors 135 may include vehicle speed sensors (e.g., wheel sensors) to detect the speed of vehicle 100, temperature sensors to detect the operating temperature of the vehicle's various components, air sensors to detect oxygen level in the engine, cameras to observe the surroundings of vehicle 100, etc. The various ECUs and sensors may communicate with one another via a vehicle communication bus 140. Examples of vehicle communication bus 140 may include a controller area network (CAN) bus, a local interconnect network (LIN) bus, a vehicle area network (VAN) bus, or other suitable signal buses for vehicle communication.

Vehicle 100 may also include various radio frequency (RF) transceivers to allow vehicle 100 to receive and transmit RF signals with other devices. For example, vehicle 100 may include a positioning satellite receiver 170 such as a GPS receiver to receive satellite signals that can be demodulated and decoded to determine the location of vehicle 100. The positioning satellite receiver 170 can be used by a positioning or navigation subsystem of vehicle 100 to perform routing and mapping functions.

Vehicle 100 may include a tunable transponder 180 that can communicate with toll stations operating at different radio frequencies, for example, to obtain permission to access a toll road or a restricted area. In some embodiments, tunable transponder 180 can be integrated into part of vehicle 100. For example, tunable transponder 180 can be integrated inside the roof, the front bumper, the fender, the side mirror of vehicle 100, or other suitable parts of vehicle 100 that would allow tunable transponder 180 to communicate with a toll station. Tunable transponder 180 can be, for example, installed in vehicle 100 at the time of manufacture of vehicle 100, or installed subsequently as an add-on option.

In some embodiments, tunable transponder 180 may include one or more adjustable components (tunable inductors, capacitors, resistors, etc.) that can be adjusted to control a transmission and reception frequency of tunable transponder 180. For example, the adjustable components can be adjusted to set a bandpass filter cutoff frequency. Tunable transponder 180 may also include a local oscillator and a numeric controlled oscillator (NCO) that can be set to derive different internal frequencies from a local oscillator frequency to perform sampling, modulation, and demodulation of data. Tunable transponder 180 can be tuned to a frequency associated with a particular toll station in proximity to vehicle 100 such that vehicle 100 can properly communicate with the toll station. In some embodiments, tunable transponder 180 can be omitted, and vehicle 100 can obtain permission to access a toll road or restricted area without requiring the use of any transponders.

Vehicle 100 may also include a wireless communication subsystem 190 to enable network connectivity for vehicle 100. Wireless communication subsystem 190 may include one or more wireless transceivers that use WiFi, WiMax, or other types of wireless network communication protocols to connect vehicle 100 to an external network (e.g., the Internet) such that vehicle 100 can communicate with remote servers. Wireless communication subsystem 190 may also include one or more short or near range wireless transceivers such as RFID, Bluetooth or Bluetooth Low Energy, NFC, beacon, infrared transmitters and/or receivers that can be used to communicate with an access device in proximity to vehicle 100. One or more of such short or near range wireless transceivers can be mounted at suitable locations on vehicle 100 (e.g., driver side, passenger side, on dashboard, front bumper, etc.) to allow vehicle 100 to detect a nearby access device. In some embodiments, one or more of the short or near range wireless transceivers can also be used to provide geo-fencing functionalities.

Vehicle 100 may also include an in-vehicle computing system 150 that an occupant of vehicle 100 can interact with. In-vehicle computing system 150 can be an infosystem, infotainment system, or other instrumentation systems. In-vehicle computing system 150 can be mounted in the center console, dashboard, rear console, or other locations in vehicle 100 that is convenient for an occupant to access in-vehicle computing system 150. In some embodiments, in-vehicle computing system 150 can be coupled to vehicle communication bus 140 to receive vehicle status information from the ECUs and sensors 135.

In-vehicle computing system 150 may include a processor 152, a memory 160, and user interface 154. User interface 154 may include an input interface such as any number of buttons, knobs, microphone and/or a touchscreen that can receive user input, and an output interface such as a display (may be part of a touchscreen) and/or speakers. The display of user interface 154 can be integrated with the housing of in-vehicle computing system 150, or can be a separate component coupled to in-vehicle computing system 150 but mounted at a different location than in-vehicle computing system 150. For example, the display of user interface 154 can be mounted on the surface of the center console, on the dashboard, on the surface of the rear console, behind the headrest, on the interior ceiling, on the visor, or other suitable location in vehicle, and may display various types of information including information such as vehicle status information (e.g., speed, fuel economy, engine temperature, etc.), environmental information (e.g., inside/outside temperature, weather, etc.), navigation information (e.g., maps, routes, places of interests, etc.), entertainment such as videos or titles of audio selections or radio stations, transaction information, merchant information, tolling information, etc.

Memory 160 may include any combination of SRAM, DRAM, EEPROM, Flash, and/or other types of memories, etc. Memory 160 may store a number of applications such as in-vehicle access application 162, navigation application 164, entertainment application 166, and/or other applications not specifically shown such as a climate control application. Entertainment application 166 may provide an occupant of vehicle 100 with video and/or audio entertainment. For example, entertainment application 166 can play a movie on user interface 154, play an audio track via interface 154, or allow a user to tune to a radio station.

Navigation application 164 can be part of a positioning or navigation subsystem of vehicle 100, and may provide navigation functionalities such as mapping and routing functions. An occupant of vehicle 100 may input a desired location into in-vehicle computing system 150, and navigation application 164 can determine a current location of vehicle 100 using a positioning satellite receive 170, and provide directions to travel to the desired location. Navigation application 164 may display a map on user interface 154 and highlight a route to a desired destination. Navigation application 164 may also display nearby places of interests and/or nearby merchants on user interface 154.

In-vehicle access application 162 enables in-vehicle computing system 150 to interact with an access device. The access device can be nearby or in proximity to vehicle 100, or can be remote at some distance away from vehicle 100 (e.g., a remote server). In some scenarios, in-vehicle access application 162 may allow an occupant of vehicle 100 to execute a transaction with the access device without requiring the occupant to exit vehicle 100, and without requiring the occupant to use another device such as the occupant's payment card or mobile device. In-vehicle access application 162 may store account credentials for various accounts, allow an occupant to select a particular account, and transmit the account credentials associated with the selected account to an access device upon approval by the occupant.

The account credentials may include account parameters such as an account identifier or a token associated with an account that can be used as a substitute for the account identifier. The account credentials may also include a cryptogram key that can be used to generate a transaction cryptogram at the time of a transaction. During execution of the transaction, in-vehicle access application 162 may transmit the selected account identifier or the token, and a transaction cryptogram to the access device to obtain authorization for the transaction. The transaction cryptogram can be generated by encrypting transaction information (e.g., transaction amount, etc.) received from the access device and account parameters (e.g., account identifier, token, etc.) using the cryptogram key.

In some embodiments, the cryptogram key can be a limited-use key (LUK) that can be used for only a limited time or a limited number of transactions, and may need to be renewed or replenished when the limited usage has been exhausted. The token and/or LUK may each be associated with a set of one or more limited-use thresholds that limits the usage of the token and/or LUK, where once the usage of the token and/or LUK has exhausted or exceeded the corresponding set of one or more limited-use thresholds, a further transaction conducted using that token and/or LUK will be declined even if the underlying account is still in good standing. The set of one or more limited-use thresholds may include at least one of a time-to-live indicating the duration of time for which the token and/or LUK is valid, a predetermined number of transactions for which the token and/or LUK is valid, and/or a cumulative transaction amount indicating the total transaction amount summed across one or more transactions for which the token and/or LUK is valid, or any combination thereof. When the in-vehicle access application 162 detects that the token and/or LUK is about to expire, in-vehicle access application 162 may replenish the token and/or LUK by requesting such from a remote server (e.g., an issuer or cloud-based transaction service provider).

In some embodiments, the token and/or LUK may also have use-restrictions based on merchant, or merchant-type. For example, a particular token and/or LUK can be valid only at a particular merchant (e.g., Chevron), or at a merchant that provides a particular type of goods or services (e.g., fuel merchant). A particular token and/or LUK can also be restricted by location. For example, a particular token and/or LUK can be valid only when used within a particular municipality.

In some embodiments, in-vehicle access application 162 may have different modes of operation. The different modes of operation may allow in-vehicle access application 162 to interact with different types of access devices or interact with an access device in a different manner. Depending on the vehicle status of vehicle 100, the in-vehicle access application 162 can be activated into one of these operating modes. In-vehicle computing system 150 may receive a vehicle status signal from vehicle communication bus 140. The vehicle status signal may include vehicle information from the ECUs and/or sensors 135. In some embodiments, the vehicle status signal may provide an indication of the speed of vehicle 100 and/or an indication of the transmission mode (e.g., park, reverse, neutral, drive, etc.) that vehicle 100 is in. Based on the state of the vehicle status signal, in-vehicle computing system 150 can determine whether vehicle 100 is moving or in a stopped position.

For example, in-vehicle computing system 150 can determine that vehicle 100 is in a stopped position when the vehicle status signal indicates that a transmission mode of the vehicle is in park, and that vehicle 100 is moving when the vehicle status signal indicates that a transmission mode of the vehicle is in drive. In some embodiments, the speed of vehicle 100 can be used to determine whether vehicle 100 is moving or in a stopped position. In some embodiments, a hysteresis or threshold can be applied to filter out transient vehicle motion (e.g., when a vehicle stops at a stop sign, etc.). For example, in-vehicle computing system 150 can determine that vehicle 100 is in a stopped position when the vehicle status signal indicates that vehicle 100 has been motionless (e.g., zero or near-zero speed such as less than 5 mph, etc.) for over a threshold amount of time (e.g., 15 seconds, 30 seconds, 1 minute, etc.). As another example, in-vehicle computing system 150 can determine that vehicle 100 is moving when the vehicle status signal indicates that vehicle 100 has reached a predetermined minimum speed (e.g., 10 mph, 15 mph, etc.), or has maintained at least the predetermined minimum speed for over a threshold amount of time (e.g., 1 minute, 5 minutes, etc.). In some embodiments, a combination of transmission mode, vehicle speed, and/or other vehicle status information can be used to determine whether vehicle 100 is moving or in a stopped position.

In-vehicle access application 162 may have a proximity mode of operation and a tolling mode of operation. In some embodiments, in-vehicle access application 162 may omit one of these modes. The proximity mode of operation can be activated when vehicle 100 is determined to be in a stopped position. In the proximity mode of operation, in-vehicle access application 162 can detect an access device in proximity to vehicle 100 (e.g., within 5 ft., within 10 ft., within 20 ft., or within 50 ft. of vehicle 100, etc.), and establish a wireless communication channel between in-vehicle computing system 150 and the access device using an integrated wireless transceiver that is part of vehicle 100. Because in-vehicle access application 162 uses an integrated wireless transceiver that is part of vehicle 100, it is not necessary for the user or an occupant of the vehicle to use a separate mobile device to communicate with the access device. In some embodiments, geo-fencing (e.g., via use of GPS or beacons), visual awareness (e.g., using a camera of vehicle 100), and/or location of vehicle 100 can be used to detect a nearby access device.

In the proximity mode of operation, in-vehicle access application 162 allows an occupant of vehicle 100 to interact with an access device to conduct a real-time transaction (e.g., a payment transaction), provide authorization of a previously conducted transaction, order goods or services, or provide recognition of a customer arrival so that delivery of goods or services to the vehicle by the merchant can occur, etc. In some embodiments, in-vehicle access application 162 may, via user interface 154, query an occupant of vehicle 100 to see if the occupant wants to park vehicle 100, purchase a specific product (e.g., fuel), or purchase a specific service (e.g., a car wash), etc. In some embodiments, in-vehicle access application 162 may use one of the vehicle's RF transceivers to communicate to the access device that a successful transaction has occurred, as a secondary way to verify the arrival of vehicle 100, or as verification of an order placement. In some embodiments, one-way notification can be used, and may be more useful when an access device is at a location staffed by a live person so that the in-vehicle access application 162 can report out to the staffed person.

In the tolling mode of operation, vehicle 100 is in motion, and in-vehicle access application 162 can be used to execute tolling transactions to obtain permission for vehicle 100 to access one or more toll roads or to gain access to a restricted area that vehicle 100 is approaching. For ease of explanation, as used herein, a restricted area can be considered as a toll road. In-vehicle access application 162 can identify one or more toll roads (e.g., bridge crossings, highways, etc.) within a predetermined distance of vehicle 100 based on the location of vehicle 100 and/or geo-fencing techniques. In-vehicle access application 162 can obtain permission by sending account credentials directly to a remote tolling server associated with the tolling authority of the toll road using the network connectivity capabilities of vehicle 100. In some embodiments, this can be performed prior to arrival of vehicle 100 at the toll road. For example, pre-authorization to use the toll road can be obtained based on the location of vehicle 100, such as at a predetermined distance (e.g., 100 ft., 500 ft., 1 mile, etc.) before arriving at the tolling station along a particular route. In-vehicle access application 162 can indicate that permission to use a toll road is granted by audio or visual cues (e.g., displaying a message or sounding a beep via user interface 154).

In some embodiments, in-vehicle access application 162 may use tunable transponder 180 of vehicle 100 to communicate with a toll station (e.g., toll booth or toll gate) when vehicle arrives at the toll road. Tunable transponder 180 can be used to communicate the vehicle's presence (e.g., in a specific toll lane) to the toll station, or to verify to the toll station that permission to use the toll road has been granted (e.g., to be displayed on a tolling display screen). In some embodiments, tunable transponder 180 can communicate with the toll station using one-way communication. For example, the vehicle's presence or verification of permission to use the toll road can be transmitted to the toll station without tunable transponder 180 receiving any communication from the toll station. One-way communication may be useful for a toll station that is staffed by a live person such that the toll station worker is provided with verification that vehicle 100 passing by has permission to use the toll road.

In some embodiments, because permission to access a toll road can be obtained based on the location of vehicle 100 and/or geo-fencing techniques, communication with a toll station may be unnecessary, and access to use a toll road can be obtained without requiring the use of a transponder. In such embodiments, the need for transponder hardware in vehicle 100 can be eliminated. Furthermore, a toll station may also be unnecessary, and the techniques described herein can be used at any roads or restricted areas with or without a toll station.

Figure 2:
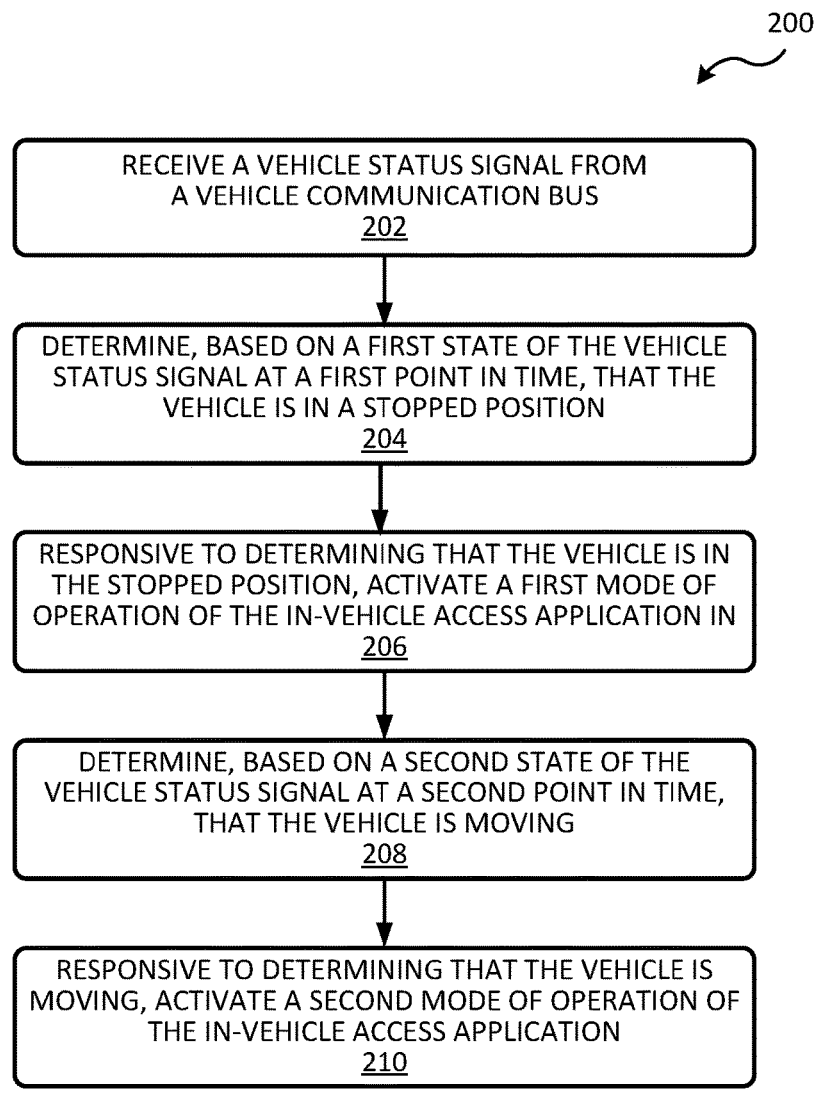
FIG. 2 illustrates a flow diagram of a mode selection process of an in-vehicle access application, according to some embodiments.

FIG. 2 illustrates a flow diagram of a mode selection process 200 that can be performed by an in-vehicle access application (e.g., in-vehicle access application 162 installed on in-vehicle computing system 150), according to some embodiments. Process 200 may begin at block 202 by receiving a vehicle status signal from a vehicle communication bus. The vehicle status signal may include vehicle information from the ECUs of the vehicle and/or information from various sensors of the vehicle. In some embodiments, the vehicle status signal may include information indicating the speed of the vehicle and/or the transmission mode that the vehicle is in.

At block 204, process 200 may determine, based on a first state of the vehicle status signal at a first point in time, that the vehicle is in a stopped position. This can be determined, for example, when vehicle speed information in the vehicle status signal indicates that the vehicle has been motionless (e.g., at zero or near zero speed such as less than 5 mph) for over a threshold amount of time (e.g., 15 seconds, 30 seconds, 1 minute, etc.). This can also be determined in the alternative or in combination, for example, when transmission mode information in the vehicle status signal indicates that the transmission mode of the vehicle is in park.

At block 206, responsive to determining that the vehicle is in the stopped position, process 200 may activate a first mode of operation of the in-vehicle access application. In some embodiments, the first mode of operation can also be activated by user input received on the user interface of in-vehicle computing system to active the first mode of operation. For example, the first mode of operation can be a proximity mode of operation in which the in-vehicle access application detects an access device in proximity to the vehicle, and establishes a wireless communication channel between the in-vehicle computing system and the access device using an integrated wireless transceiver that is part of the vehicle. In the proximity mode of operation, the in-vehicle access application may receive transaction information from the access device via the wireless communication channel, and display the transaction information on the user interface of the in-vehicle computing system to request approval from an occupant of the vehicle to transmit account credentials to the access device.

At block 208, process 200 may determine, based on a second state of the vehicle status signal at a second point in time, that the vehicle is moving or in motion. This can be determined, for example, when vehicle speed information in the vehicle status signal indicates that the vehicle has reached a predetermined minimum speed (e.g., 10 mph, 15 mph, etc.), or has maintained at least the predetermined minimum speed for over a threshold amount of time (e.g., 1 minute, 5 minutes, etc.). This can also be determined in the alternative or in combination, for example, when transmission mode information in the vehicle status signal indicates that the transmission mode of the vehicle is in drive.

At block 210, responsive to determining that the vehicle is moving, process 200 may activate a second mode of operation of the in-vehicle access application. In some embodiments, the second mode of operation can also be activated by user input received on the user interface of in-vehicle computing system to active the second mode of operation. For example, the second mode of operation can be a tolling mode of operation. In the tolling mode of operation, the in-vehicle access application may identify a toll road within a predetermined distance of the vehicle based on the location of the vehicle, determine that the vehicle is approaching the toll road, and transmit account credentials stored in the in-vehicle computing system to a remote tolling server to obtain permission for the vehicle to access the toll road prior to arrival of the vehicle at the toll road. In the tolling mode of operation, the in-vehicle access application may also identify a toll station within a predetermined distance of the vehicle based on the location of the vehicle, determine a transponder frequency of the toll station, tune the frequency of a tunable transponder integrated as part of the vehicle to match the determined transponder frequency of the toll station prior to arrival of the vehicle at the toll station, and transmit account credentials stored in the in-vehicle computing system to the toll station using the determined transponder frequency when the toll station is in proximity to the vehicle. The in-vehicle access application may also determine a protocol message format associated with the toll station, and the account credentials can be transmitted to the toll station using the determined protocol message format.

Additional details of how the different modes of operation of the in-vehicle access application interact with access devices will now be described.

II. Tolling Mode and Interactions with Toll System

Different toll systems around the world may use different wireless communication technologies. For example, different municipals at different regions, or even different toll roads within a municipal may use a different set of communication protocols for their toll transaction communications. As a result, a user who may travel across different municipalities or different toll roads may be required to use multiple transponders, each tailored for a particular municipality or toll road, to be able to communicate with the toll stations in each area. Furthermore, the user may have to register each transponder with its respective municipal or toll system, and provide the user's personal identifying information and account information to each toll authority. In some embodiments, the tolling mode of the in-vehicle access application can be used to implement a universal toll system to conduct toll transactions across different municipalities or different toll authorities.

In some embodiments, a tunable transponder of a vehicle can be automatically configured to be compatible with a particular toll authority based on the location and/or trajectory of the vehicle. In some embodiments, the tunable transponder can be integrated as part of the vehicle, and be coupled to and be controlled by an in-vehicle computing system. The location of the vehicle, as available to the in-vehicle computing system (e.g., via positioning satellite receiver), can be used to identify one or more toll authorities within a geographic area or region of the location of the vehicle. Based on the identified one or more toll authorities, toll station communication protocol information specific to the one or more toll authorities in the geographic area can be retrieved. An in-vehicle access application can preconfigure and tune the tunable transponder to be compatible with the communication protocol of a toll station operated by an identified toll authority prior to the arrival of the vehicle at the toll station. As the vehicle passes by the toll station, the tunable transponder of the vehicle (having been preconfigured to communicate with the toll gate) can transmit or otherwise exchange information with the toll station, and thereby provide the vehicle with access to the toll road.

The universal toll system according to some embodiments may eliminate the need for a user to register a transponder with multiple municipal districts or to use a different transponder for each district. This can remove the clutter associated with having multiple transponders attached to the interior of a vehicle and may reduce accidents associated with reduced visibility. The universal toll system may also allow a user to retain more control over his/her account information by allowing the user to elect a user-designated transaction method to be directly debited or charged for all toll passages. This may eliminate the need for the user to create multiple deposit accounts with multiple municipal districts, and may also reduce the possibility of fraud and identity theft by allowing the user to retain their personal and financial account information instead of having a municipal district to maintain a database of such information.

According to some embodiments, the in-vehicle access application installed on the in-vehicle computing system may allow a user to designate a preferred transaction method (e.g., a particular account) to be associated with automatic tolls. The in-vehicle access application may inform a user, based on location of the vehicle, if the preferred transaction method has sufficient funds to adequately cover an approaching toll or a series of tolls required to reach a desired destination. The system does not require a constant network connection, because a toll transaction conducted at the toll station can be authorized without network connectivity (e.g., only requires transponder communication). The in-vehicle access application may ping the registered account daily or mid-journey to ensure a minimum balance when network connection is available prior to arrival at the toll station, and can debit the account at a later time when network connection is available after using the toll road. Alternatively, the system can debit a sufficient amount of funds to cover all of the tolls in a user-specified radius and return the remaining balance at the end of the day (e.g., in the same way that a car rental organization charges a deposit for car rentals).

Figure 3:
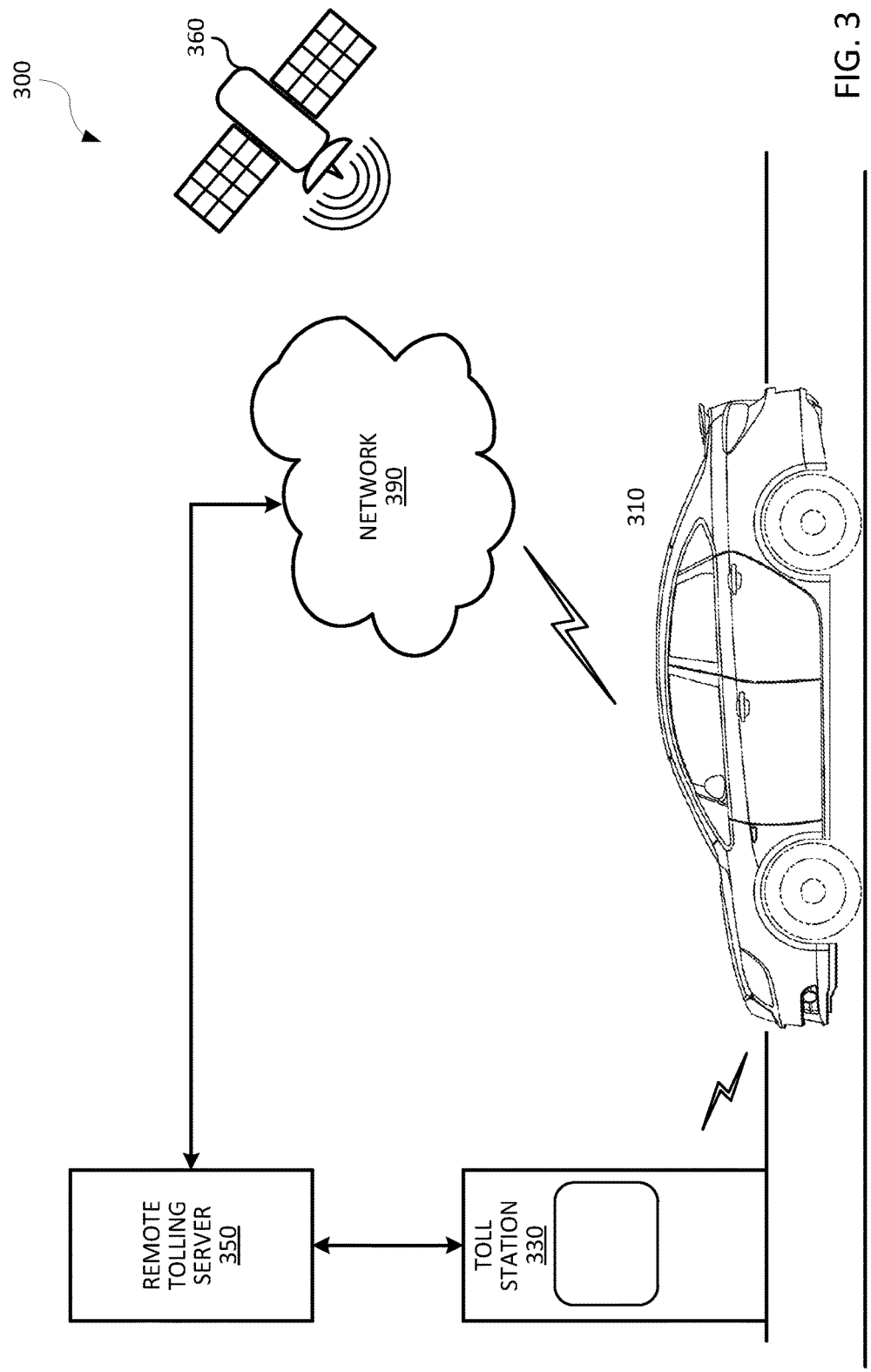
FIG. 3 illustrates a toll system, according to some embodiments.

FIG. 3 illustrates various entities of a toll transaction system 300, according to some embodiments. Toll transaction system 300 includes a vehicle 310, a toll station 330 operated by a toll authority, a remote tolling server 350 that may be operated by a toll transaction service provider, and a satellite positioning system such as GPS that has a system of satellites (e.g., satellite 360) orbiting around the globe. Vehicle 310 is equipped with a tunable transponder that can be tuned to transmit and/or receive communications (e.g., using radio frequency technologies such as RFID) at various frequencies such that the tunable transponder can communicate with toll stations operated by different toll authorities. For example, the tunable transponder can be tuned to communicate with toll station 330 (may also be referred to as a toll reader) at a frequency specified by the toll authority of toll station 330, which is equipped with an antenna configured to operate and communicate at the prescribed frequency. Vehicle 310 may include a navigation subsystem that can receive satellite positioning signals from satellite 360 and the like to determine the location of the vehicle 310. Vehicle 310 may also be equipped with a network-enabled in-vehicle computing system having an in-vehicle access application to communicate with remote tolling server 350 via network 390. Network connectivity can be achieved, for example, using WiFi, WiMax, or other wireless network communication protocols when vehicle 310 is within range of a wireless access point. By utilizing a network-enabled in-vehicle computing system, vehicle 310 can communicate directly with remote tolling server 350 without being tethered to a user's mobile device (e.g., a smartphone), and thus eliminates the need to couple or pair vehicle 310 with a user's mobile device.

Figure 4:
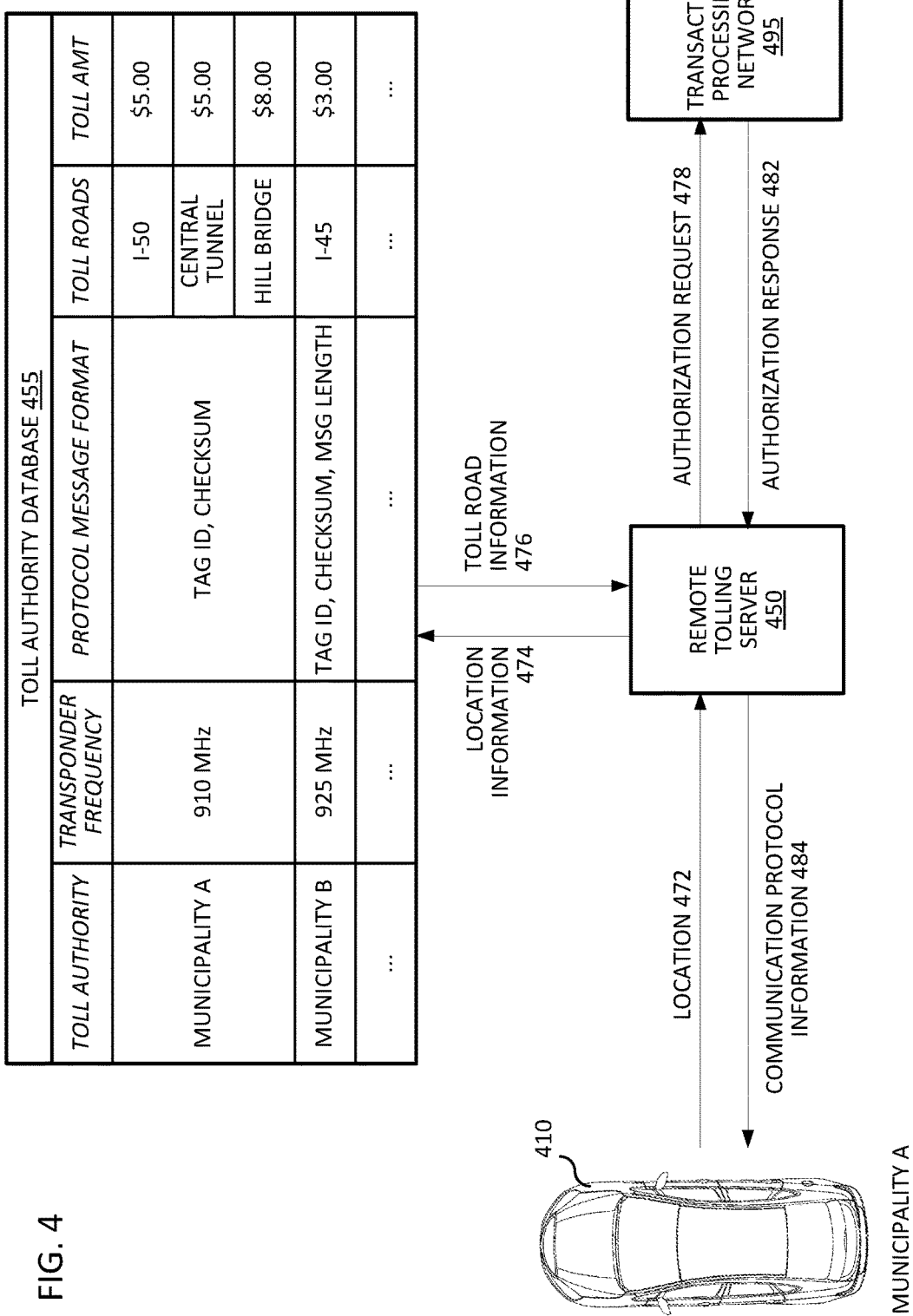
FIG. 4 illustrates example interactions between a vehicle and a remote tolling server, according to some embodiments.

FIG. 4 illustrates a conceptual diagram of the interactions between the in-vehicle access application installed on vehicle 410 operating in the tolling mode and a remote tolling server 450, according to some embodiments. In-vehicle access application of vehicle 410 may interact with a remote tolling server 450 to download toll road information (e.g., toll authority communication protocol information), and to conduct pre-authorization for a toll transaction to obtain permission to access a toll road. Vehicle 410 can communicate with remote tolling server 450 when vehicle 410 is within range of a wireless network access point (e.g., when vehicle 410 is at home, when vehicle 210 is transiting through a coverage area, etc.). The system does not require a constant network connection because the pre-authorization for toll transactions and download of toll road information can be performed, for example, daily or mid-journey. In some embodiments, vehicle 410 can communicate with remote tolling server 450 periodically (e.g., once an hour, once every 12 hours, once a day, etc.) whenever network access is available.

In the example shown in FIG. 4, vehicle 410 is currently located in Municipality A. The location of vehicle 410 can be determined, for example, by the navigation subsystem of vehicle 410. When vehicle 410 establishes network connectivity, the in-vehicle access application of vehicle 410 may send the vehicle's location 472 to remote tolling server 450. Upon receiving location 472, remote tolling server 450 may use location information 474 of vehicle 410 to query a toll authority database 455 to obtain toll road information about toll roads within a geographic area of vehicle 410 (e.g., within a 5 mile radius, 10 mile radius, 20 mile radius, 50 mile radius, 100 mile radius, etc.).

Toll authority database 455 may store various information about toll roads around the world. For example toll authority database 455 may store a list of toll authorities, transponder frequencies used by the toll authorities, communication protocol message formats used by the toll authorities, a list of toll roads operated by the toll authorities, and the toll amount for each toll road. In the example shown, municipal A may operate toll roads I-50, Central Tunnel, and Hill Bridge with respective toll amounts of $5.00, $5.00, and $8.00. The toll roads operated by Municipality A may use a transponder frequency of 910 MHz, and the communication protocol message format sent from a vehicle transponder to a toll station in Municipality A may include the tag ID of the transponder and a checksum. Municipality B may operate toll road I-45 with a toll amount of $3.00. Municipality B may use a transponder frequency of 925 MHz, and the communication protocol message format sent from a vehicle transponder to a toll station in Municipality B may include the tag ID of the transponder, a checksum, and a message length. It should be understood that these are just examples, and that some embodiments may have different values associated with each information field. Furthermore, in some embodiments, toll authority database 455 may store fewer or more information than those shown in FIG. 4.

Upon receiving location information 474, toll authority database 455 may return toll road information 476 to remote tolling server 450. Toll road information 476 provided to remote tolling server 450 may include information identifying each toll road and their respective toll amount, and the transponder frequency and protocol message format used by each toll road. In some embodiments, toll road information 476 can be restricted, for example, to the particular municipal district that vehicle 410 is currently located at (e.g., Municipality A), or to within a radius (e.g., 10 miles, 20 miles, 50 miles, 100 miles, etc.) of the current location of vehicle 410. For example, if the toll road information is restricted by the particular municipal district, toll road information 476 provided to remote tolling server 450 may include information for I-50, Central Tunnel, and Hill Bridge. If the toll road information is restricted by a radius of the current location of vehicle 410, toll road information 476 may include information for I-50 but not Central Tunnel and Hill Bridge if these toll roads are outside a geographic radius of vehicle 410. It should be noted that in embodiments in which the toll road information is restricted by a geographic radius, toll road information 476 provided to remote tolling server 450 may include toll road information of toll roads operated by more than one toll authority, for example, if vehicle 410 is near the border between two municipal districts.

Once remote tolling server 450 obtains toll road information 476, remote tolling server 450 may determine a pre-authorization amount that would allow vehicle 410 to use all the toll roads within a geographic area of vehicle 410. The pre-authorization amount can be, for example, a sum of the toll amounts for all the toll roads within the geographic area, the largest toll amount of all toll roads within the geographic area, or double the above amounts, for example, to allow vehicle 410 to conduct a round trip journey if a toll road requires toll amounts in both directions. Remote tolling server 450 may then determine if the user's registered account with remote tolling server 450 has sufficient funds to pay for the toll roads within a geographic area of vehicle 410. If there are insufficient funds, remote tolling server 450 may send an authorization request message 478 to a transaction processing network 495 to debit the account of the user to load the requisite funds, and transaction processing network 495 may send an authorization response message 482 back to remote tolling server 450 indicating approval of the transaction. In some embodiments, at the end of the day, an unused balance may be credited back to the user's account. Additionally, if remote tolling server 450 determines that there are insufficient funds in the registered account, remote tolling server 450 may request the user to register a different transaction method, divide multiple toll amounts among multiple registered transaction methods, and/or inquire as to how to proceed in light of the insufficient funds.

Upon determining that the registered transaction method of the user has sufficient funds to cover the toll amounts, remote tolling server 450 may then send the communication protocol information 484 to vehicle 410 to enable the in-vehicle access application of vehicle 410 to configure the vehicle's tunable transponder for the appropriate toll roads. Communication protocol information 484 may include, for example, a transponder frequency and a corresponding communication protocol message format for the toll roads within the geographic area of vehicle 410. In some embodiments, remote tolling server 450 may also provide the in-vehicle access application of vehicle 410 with a verification code that the toll station can use to verify that vehicle 410 has been granted permission to access the toll road. The in-vehicle access application of vehicle 410 may then tune and configure the tunable transponder of vehicle 410 to the appropriate frequency to communicate with the approaching toll station. When vehicle 410 arrives at the toll station, the in-vehicle access application of vehicle 410 may transmit account credentials (e.g., account credentials associated with the user's transaction account or registered account with remote tolling serve 450) and/or verification information that the toll station can use to verify vehicle 410 (e.g., a verification code, identification information to identify vehicle 410, or a tag ID of the tunable transponder, etc.). The station may then verify the account credentials or the verification information, and allow vehicle 410 to access the toll road.

According to some embodiments, some or all of the information stored in toll authority database 455 may be integrated within the in-vehicle computing system of vehicle 410. In embodiments, the in-vehicle access application of vehicle 410 may determine toll road information and pre-authorization amounts without contacting remote tolling server 450. Nevertheless, remote tolling server 450 may still be used to perform maintenance on the user's account, for example, to ensure that the user's registered transaction method has sufficient funds to cover toll amounts within the geographic area of vehicle 410.

In some embodiments, it may be unnecessary for a user to register an account with remote tolling server 450. To obtain permission to access a toll road prior to arriving at the toll station, the in-vehicle access application of vehicle 410 may send account credentials associated with the user's transaction account to remote tolling server 450. Remote tolling server 450 may then communicate with transaction processing network 495 to obtain authorization for the toll transaction using the user's transaction account. Upon authorization, remote tolling server 450 may send a verification code to the in-vehicle access application of vehicle 410. When vehicle 410 arrives at the toll station, the in-vehicle access application of vehicle 410 may transmit the verification code to the toll station to verify that vehicle 410 has obtained permission to access the toll road. In some embodiments, the permission to access the toll road can be obtained when vehicle 410 arrives at the toll station. For example, account credentials associated with a user's transaction account can be transmitted to the toll station, and the toll station may communicate with transaction processing network 495 to obtain authorization for the toll transaction using the account credentials.

Figure 5:
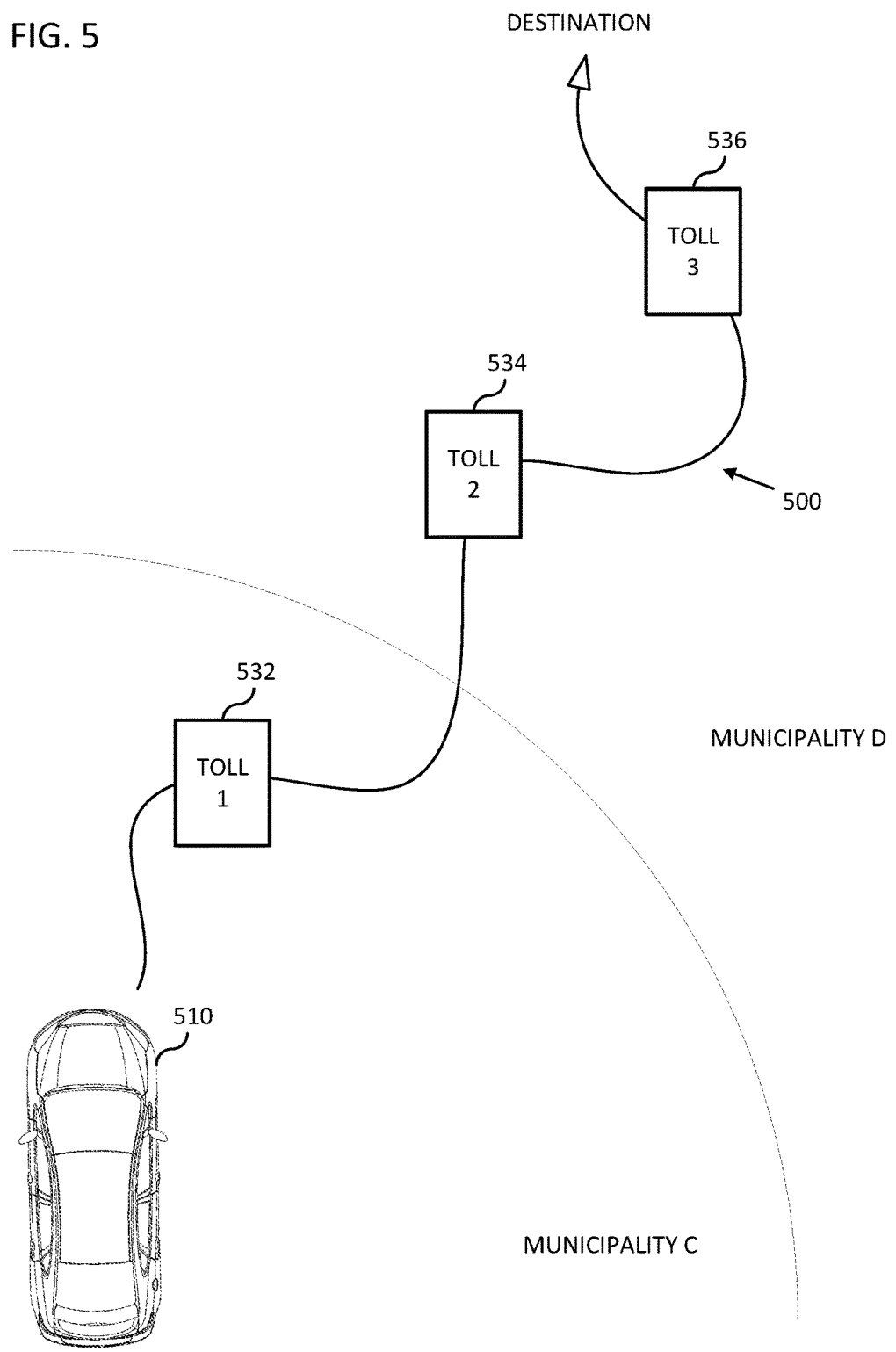
FIG. 5 illustrates an example of a route to a destination, according to some embodiments.

According to some embodiments, if a user has mapped out a route to a particular destination using the vehicle's navigation subsystem, the universal toll transaction system can be used to determine the total amount of tolls for the entire trip. FIG. 5 illustrates an example of a route 500 to a destination to be transited by vehicle 510, according to some embodiments. In the example shown, the particular route to the destination may transit through three toll roads and respective toll stations 532, 534, and 536. Toll station 532 may be operated by Municipality C, and toll stations 534 and 536 may be operated by Municipality D. Based on the route information, a pre-authorization amount being the sum of the toll amounts for the three toll roads can be calculated. The system can determine that a user's registered transaction method has sufficient funds for this amount, and provide vehicle 510 with communication protocol information for each of the toll stations.

Initially, the tunable transponder of vehicle 510 can be configured to operate at the frequency and with the protocol message format corresponding to toll station 532. As vehicle 510 passes toll gate 532, the tunable transponder of vehicle 510 can transmit account credentials or a verification code to toll gate 332 in accordance with the communication protocol of toll gate 532. After passing toll gate 532, using the route information, the tunable transponder of vehicle 510 can be reconfigured to operate at the frequency and with the message format corresponding to toll gate 534. As vehicle 510 passes toll gate 534, the tunable transponder of vehicle 510 can transmit account credentials or a verification code to toll gate 534 in accordance with the communication protocol of toll gate 534. After passing toll gate 534, if necessary, the tunable transponder of vehicle 510 can be further reconfigured for toll gate 536. If the communication protocol (e.g., frequency and protocol message format) for toll gate 536 is the same as that for toll gate 538 (e.g., since they are both operated by Municipality D), reconfiguration of the tunable transponder can be omitted. In some embodiments, the toll amount for the entire trip can be conducted without any network connectivity because the communication protocol information for the three toll roads have been downloaded to vehicle 510 at the beginning of the trip. At a later time when vehicle 510 obtains network connectivity to communicate with the remote tolling server, the sum of the toll amounts for the entire trip can be subtracted from the balance of the user's register account.

Figure 6:
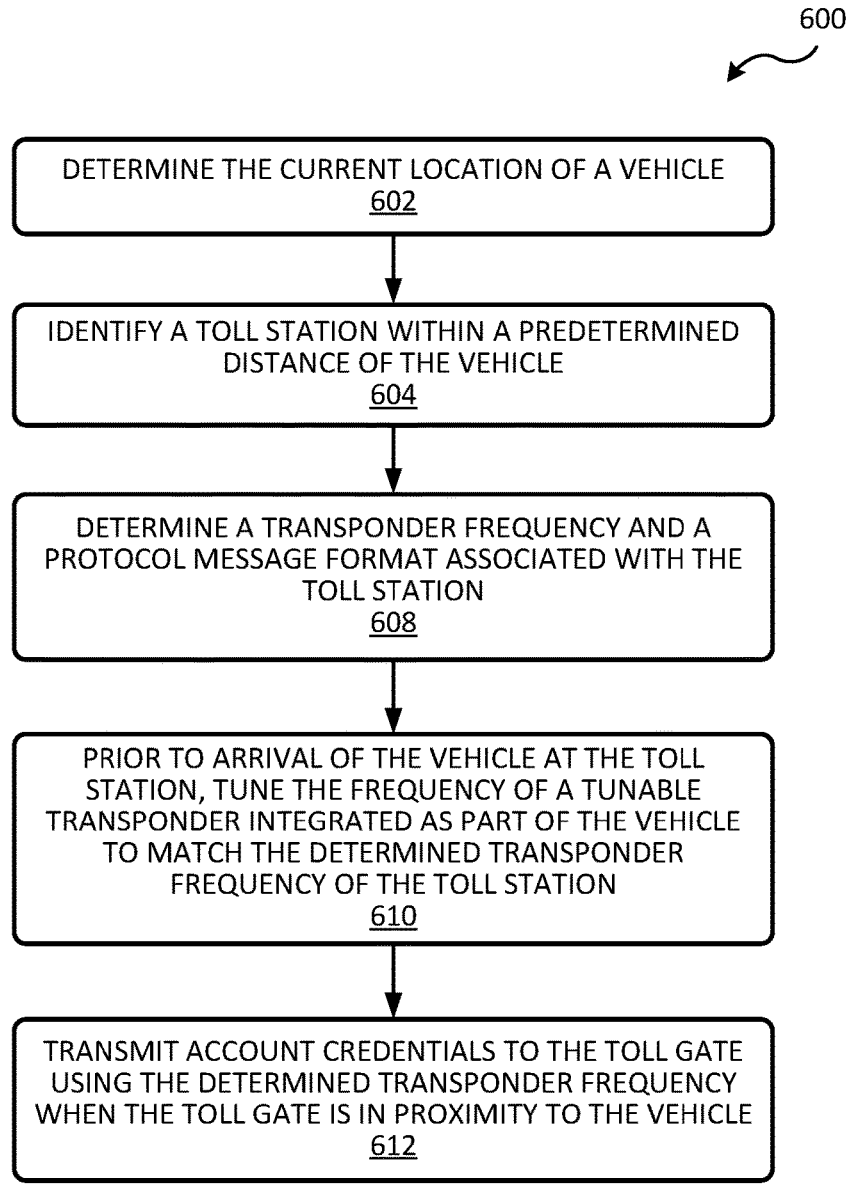
FIG. 6 illustrates a flow diagram of a process for conducting a toll transaction using a tolling mode of an in-vehicle access application, according to some embodiments.

FIG. 6 illustrates a flow diagram of a process 600 for conducting a toll transaction using an in-vehicle access application operating in a tolling mode, according to some embodiments. At block 602, the current location of a vehicle is determined. The current location can be determined, for example, using a vehicle's positioning or navigation subsystem or positioning satellite receiver. At block 604, a toll station associated with a toll road within a predetermined distance of the vehicle is identified based on the current location of the vehicle. The toll station can be identified using information from a toll authority database. In some embodiments, some or all of the information in the toll authority database can be stored in the in-vehicle computing system of the vehicle. In some embodiments, the toll authority database can be a remote database, and can be accessed via communication with a remote tolling server.

At block 608, toll road information such as toll amount, a transponder frequency, and/or other communication protocol information such as a protocol message format associated with the toll station are determined. The toll road information can be determined, for example, using the toll authority database described herein. In some embodiments, based on the toll amount associated with the toll road, the in-vehicle access application can communicate with a remote tolling server to verify that there are sufficient funds in the user's account to cover the toll, or to obtain a pre-authorization to provide a user's registered account with the requisite funds if current funds are insufficient.

At block 610, prior to the arrival of the vehicle at a toll station associated with the toll road, the in-vehicle access application tunes the frequency of a tunable transponder integrated as part of the vehicle to match the determined transponder frequency of the toll station. In some embodiments, the in-vehicle access application may request confirmation from the user of the vehicle that the upcoming toll amount should be automatically conducted via the tunable transponder. In some scenarios, the driver of the vehicle may want to pay with cash, or the vehicle may have enough occupants to satisfy a high-occupancy vehicle requirement to omit paying tolls. In such scenarios, the user may deny automatic toll payment, and the tunable transponder can be disabled as the vehicle transit through the toll station.

At block 612, when the vehicle arrives at the toll road and comes in proximity to the toll station such that the tunable transponder is within communication range of the toll station, account credentials or verification information can be transmitted from the tunable transponder of the vehicle to the toll station using the determined transponder frequency and determined protocol message format compatible with the toll station. The account credentials transmitted from the tunable transponder of the vehicle to the toll station may include account information associated with a user's transaction account or account registered with the remote tolling server. The verification information may include a verification code obtained from the remote tolling server to verify that the vehicle has been granted permission to access the toll road, or identification information identify the vehicle or a tag ID of the tunable transponder. At some later time, when vehicle acquire network connectivity, the toll transaction can be settled with the user's account via a remote tolling server.

Figure 7:
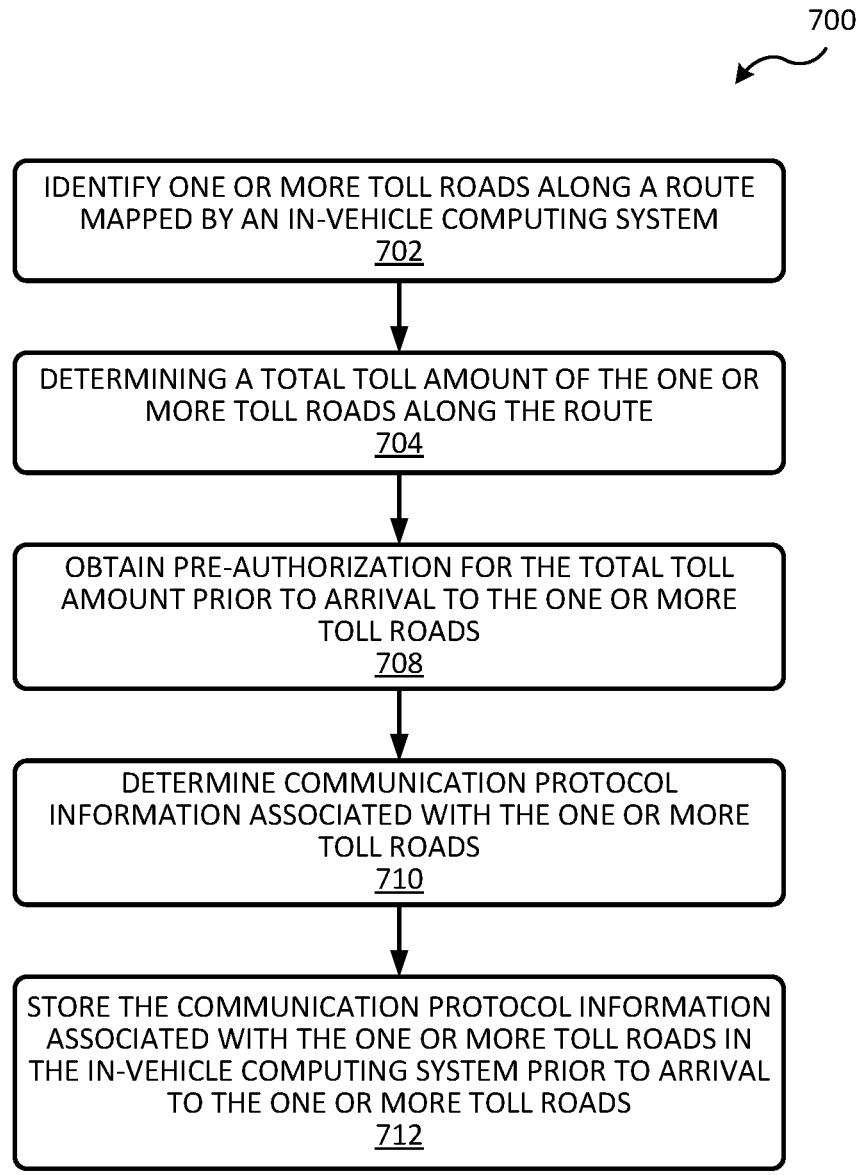
FIG. 7 illustrates a flow diagram of a process for setting up a vehicle to conduct multiple toll transactions along a route using a tolling mode of an in-vehicle access application, according to some embodiments.

FIG. 7 illustrates a flow diagram of a process 700 for setting up a vehicle to conduct automatic toll transactions along a route using an in-vehicle access application operating in a tolling mode, according to some embodiments. At block 702, one or more toll roads along a route (e.g., a trip) mapped by an in-vehicle computing system are identified. The route can be mapped, for example, in response to user input identify a destination that the user is attempting to reach. At block 704, the total toll amount of the one or more toll roads along the route is determined. The toll amount information can be determined, for example, using a toll authority database according to the techniques described herein.

At block 708, prior to arrival of the vehicle at any of the identified toll roads, the in-vehicle access application installed in the in-vehicle computing system may communicate with a remote tolling server to obtain pre-authorization for the total toll amount that covers all the toll roads along the route, or otherwise verify that the user's account associated with the vehicle has sufficient funds to cover the total toll amount. If the user's account does not have sufficient funds, the remote tolling server may communicate with a transaction processing network to obtain sufficient funds from a transaction account associated with the user. In some embodiments, the remote tolling server may debit a pre-selected alternative payment source or may inquire from the user as to how to proceed when there are insufficient funds.

At block 710, the communication protocol information (e.g., transponder frequency, protocol message format, etc.) associated with the one or more toll roads are determined, for example, using the toll authority database described herein. In some embodiments, the communication protocol information can be provided to the in-vehicle computing system from a remote tolling server. At block 712, the communication protocol information associated with the one or more toll roads along the route is stored in the in-vehicle computing system prior to arrival of the vehicle at any of the identified toll roads. In this manner, the in-vehicle access application can automatically tune and configure the vehicle's tunable transponder appropriately to be compatible with the toll stations associated with the toll roads along the route as the vehicle approaches each toll road.

In some embodiments, it may be unnecessary for a toll road to have a toll station. An in-vehicle access application operating in a tolling mode may communicate with a remote tolling server to obtain permission to access the toll road by paying the toll prior to arrival of the vehicle at the toll road. As such, because the toll transaction has already been performed, communication with a toll station when the vehicle arrives at the toll road can be omitted. In such embodiments, a vehicle can access the toll road without requiring the use of a transponder.

Figure 8:
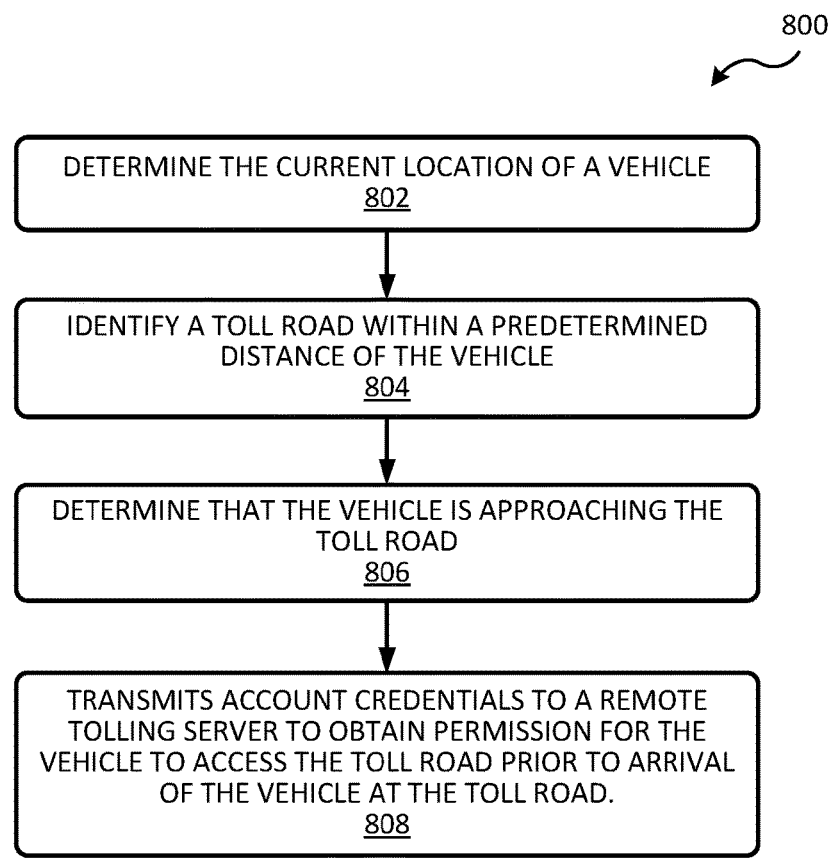
FIG. 8 illustrates a flow diagram of a process for conducting a toll transaction without a toll station using a tolling mode of an in-vehicle access application, according to some embodiments.

FIG. 8 illustrates a flow diagram of a process 800 for conducting a toll transaction using an in-vehicle access application operating in a tolling mode without the requirement of a toll station or transponder, according to some embodiments. At block 802, the current location of a vehicle is determined. The current location can be determined, for example, using a vehicle's positioning or navigation subsystem or positioning satellite receiver. At block 804, a toll road associated within a predetermined distance of the vehicle is identified based on the current location of the vehicle. The toll road can be identified using information from a toll authority database. In some embodiments, some or all of the information in the toll authority database can be stored in the in-vehicle computing system of the vehicle. In some embodiments, the toll authority database can be a remote database, and can be accessed via communication with a remote tolling server.

At block 608, an in-vehicle access application determines that the vehicle is approaching the identified toll road, for example, based on the geo-fencing or the location of the vehicle. At block 610, prior to the arrival of the vehicle at a toll road, the in-vehicle access application, using the network connectivity capabilities of the vehicle, transmits account credentials to a remote tolling server to obtain permission for the vehicle to access the toll road. In some embodiments, to reconcile which vehicle has permission to access the toll road, cameras at the entrance to the toll road can capture, for example, the license plates of vehicles passing by. The license plate information can be sent to the remote tolling server to determine whether a particular vehicle has obtained permission to access the toll road.

In such embodiments where it may be unnecessary for a toll road to be equipped with a toll station, a vehicle need not reduce speed or stop when entering the toll road to ease traffic congestion. Such embodiments can also be implemented at roads that are newly tolled with minimal infrastructure changes. Such embodiments can also eliminate the need to use a transponder to gain access to a toll road.

III. Proximity Mode and Interactions with Proximity Access Device

Various types of transactions can be conducted by a user in the presence of the user's vehicle. For example, a user may purchase fuel for the vehicle at a refueling station, pay for parking for the vehicle, or operate the vehicle through a drive-thru restaurant to purchase food, etc. In most cases, a user may conduct these transactions either by swiping a credit card at a point-of-sale terminal or hand the user's credit card to a merchant employee to complete the transaction. However, doing so may run the risk of the account credentials being stolen by skimming devices installed at the point-of-sale terminal, or by a merchant employee that comes in contact with the account credentials. In some embodiments, operating an in-vehicle access application in proximity mode can mitigate some of these risks when executing a transaction with an access device.

According to some embodiments, an in-vehicle access application installed in a vehicle that can be used to conduct transactions. The in-vehicle access application operating in proximity mode allows transactions to be made directly from a network-enabled vehicle without third party intervention. The in-vehicle computing system does not require tethering to a user's mobile device (e.g., a smartphone), and thus allows transactions to be conducted in the absence of a user's mobile device and eliminates the need to couple or pair the vehicle with the user's mobile device. In some embodiments, in-vehicle access application operating in proximity mode may use one or more wireless communication technologies such as RFID, Bluetooth or BLE, NFC, beacon, WiFi, WiMax, infrared, or other types of wireless communication technologies to conduct transactions from the interior of a vehicle. Purchases can be made over a wireless connection between an access device and the vehicle in which in-vehicle access application resides. Antennas and sensors at the merchant can verify the presence of the vehicle and communicate directly with the in-vehicle access application installed in the vehicle. The in-vehicle access application can be used, for example, at drive-thru merchants, refueling stations, parking garages, parking meter locations, and/or other merchants where a user can make purchases from a vehicle or pick up goods or services via the vehicle. In some embodiments, a user may also use the in-vehicle access application to purchase media (e.g., music, videos, etc.) for playback on the in-vehicle computing system.

In some embodiments, the in-vehicle access application may utilize a consumer verification method (e.g., PIN, password, biometric, etc.) to authenticate the transaction. This allows a user to approve the transaction from within the vehicle, and thus may eliminate the need for the user to exit or leave the vehicle to complete the transaction. The in-vehicle access application may allow a user to approve a transaction by requesting a PIN, passcode, or biometric data (e.g., voice, fingerprint, or retinal ID) from the user. In some embodiments, a user may provide a predetermined gesture or motion to the user interface of the in-vehicle computing system to approve the transaction, and/or by signing an area of a touch screen of the in-vehicle computing system (e.g., with a finger, stylus, or digital pen). Because the in-vehicle access application can utilize a consumer verification method to execute transactions, unauthorized transactions in the absence of the user can be prevented, for example, in case of vehicle theft or when the vehicle is being operated by someone else such as a parking attendant. In some embodiments, an additional layer of security may involve identification of a vehicle's VIN number, make, model, color, and/or license plate, etc., and correlating such with the account credentials of a user.

In some embodiments, the location of the vehicle (e.g., as determined by the vehicle's positioning or navigation system) can also be used as an additional layer of security. For example, the in-vehicle access application may require the vehicle to be within a certain distance of an access device of a merchant, or within the same district or city as the merchant to conduct a transaction with that merchant. In scenarios in which a user is pre-purchasing goods or services that may be picked up at a later time, the in-vehicle access application may allow location verification to be disabled for the purchase at the time the order is placed, for example, by obtaining pre-authorization on purchases from merchants that are not within a certain distance of the vehicle, or by providing authentication through other security methods such as requesting the entry of a PIN, passcode, or biometric data.

According to some embodiments, a user can program and register account credentials associated with a transaction account directly into the in-vehicle computing system without having to go through a third-party. This may allow the user to have more control over the sharing of the user's personal and financial account information. This may also reduce the need for the user to set up multiple accounts with different merchants (which may increase the risk of fraud and loss of personal or account information due to exposure of such information to multiple parties). In some embodiments, a user may also enter account credentials for multiple accounts into the system, and a user can select one of the accounts as the transaction method for each individual transaction initiated from the vehicle.

For example, a user may register an account to be used for a particular category of goods (e.g., groceries, fuel, parking, etc.), for transactions conducted within a specific geographic region or time period, or for a particular occupant of the vehicle. The in-vehicle access application's interoperability with multiple merchants also means that the user can use the in-vehicle computing system as a single point interface to select a preferred transaction method, as opposed to systems that may require separate interfaces and accounts for each merchant. The in-vehicle access application may reduce the risks associated with physically carrying a payment card and handing it to another person. The in-vehicle access application may also reduce the risks associated with skimming devices installed on point-of-sale terminals, because the in-vehicle access application relies on wireless communication between a vehicle and a merchant or transaction processing network. In some embodiments, tokens can also be used as a substitute for primary account numbers (PAN) such that purchases can be made without providing the user's real account number.

Figure 9:
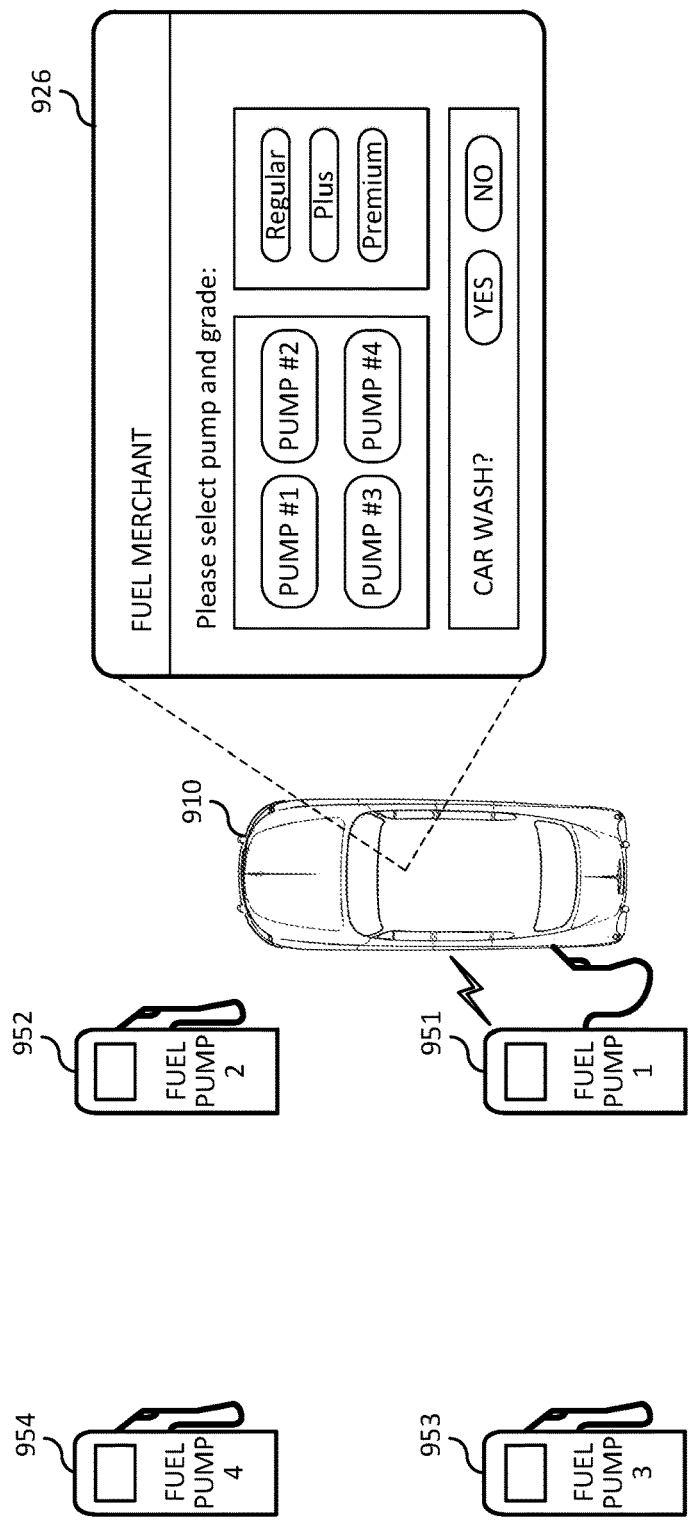
FIG. 9 illustrates an example of a scenario in which a proximity mode of an in-vehicle access application can be used, according to some embodiments.

FIG. 9 illustrates an example of a scenario in which the in-vehicle access application operating in proximity mode can be used to execute a transaction, according to some embodiments. In FIG. 9, a user operating vehicle 910 may pull up to a refueling station (e.g., gas station, charging station, etc.) to purchase fuel for vehicle 910. The refueling station may also offer other services such as an automated car wash. The refueling station may have four fuel pumps 951-954 (or chargers, etc.). Each fuel pump may have its own wireless-enabled access device that can communicate with an in-vehicle computing system to conduct wireless transactions.

As vehicle 910 approaches the refueling station, the vehicle's navigation subsystem may recognize that the location of vehicle 910 coincides with or is near the location of the refueling station. Using the location of vehicle 910, the in-vehicle access application may communicate with a server via the vehicle's network-enabled in-vehicle computing system to download merchant information about the refueling station. The server can be a server that is maintained by the refueling station and located at the refueling station location, or be a remote server located elsewhere that is operated, for example, by the merchant, a mobile transaction service provider, a directory service provider, or the like that maintains a database of merchant information. Communication with the server can be achieved, for example, using WiFi, WiMax, or other wireless network communication protocols that can access a network such as the Internet.

In some embodiments, the in-vehicle computing system of vehicle 910 may already have merchant information about the refueling station, for example, if the in-vehicle computing system itself maintains a database of merchant information, or if the merchant information has been previously downloaded to the in-vehicle computing system. In such embodiments, communication with the server to retrieve merchant information may be omitted. In some embodiments, the merchant information can be provided to the in-vehicle computing system via short or near range wireless communication technology from an access device of the fuel pump (e.g., fuel pump 951) in proximity to vehicle 910.

The merchant information may include the merchant's name, location, types of goods and/or services and associated prices offered by the merchant, etc., and in some embodiments, if more than one access device is available at the merchant location, a listing of the access devices available. For example, the merchant information for the refueling station may include a listing of fuel pumps available, the different grades of fuel available, and the availability of a car wash service for purchase, etc. Based on this information, the in-vehicle access application may generate a fuel selection menu 926 that can be displayed on the user interface (e.g., a touchscreen) of the in-vehicle computing system. For example, fuel selection menu 126 may allow a user to select the fuel pump number, the grade of fuel, and whether the user wants to purchase a car wash. Using the in-vehicle computing system, the user can select a particular fuel pump (e.g., fuel pump 951) and purchase a particular grade of fuel for vehicle 910 as well as other services such as a car wash.

Once the items (e.g., fuel) or services (e.g., car wash) for purchase have been selected by the user, the in-vehicle access application may request the user to select a transaction method (e.g., transaction account) previously registered with the in-vehicle computing system to complete the transaction. In some embodiments, the in-vehicle access application may use an additional layer of authentication to complete the transaction, for example, by using a consumer verification method (e.g., entry of PIN, password, biometric, etc.). Once the user has confirmed the transaction, transaction information including account credentials (e.g., PAN or token, transaction cryptogram, etc.) can be transmitted to the access device of fuel pump 951 using a wireless communication technology (e.g., RFID, Bluetooth or Bluetooth Low Energy, NFC, beacon, WiFi, WiMax, infrared, etc.). In some embodiments, the location of the vehicle (e.g., as determined by the vehicle's navigation subsystem) may also be included in the transaction information such that location-based authentication can be performed on the transaction. Upon receiving the transaction information, the access device of fuel pump 951 may verify the user's account credentials and enable the fuel pump to flow such that the user can refuel vehicle 910.

Figure 10:
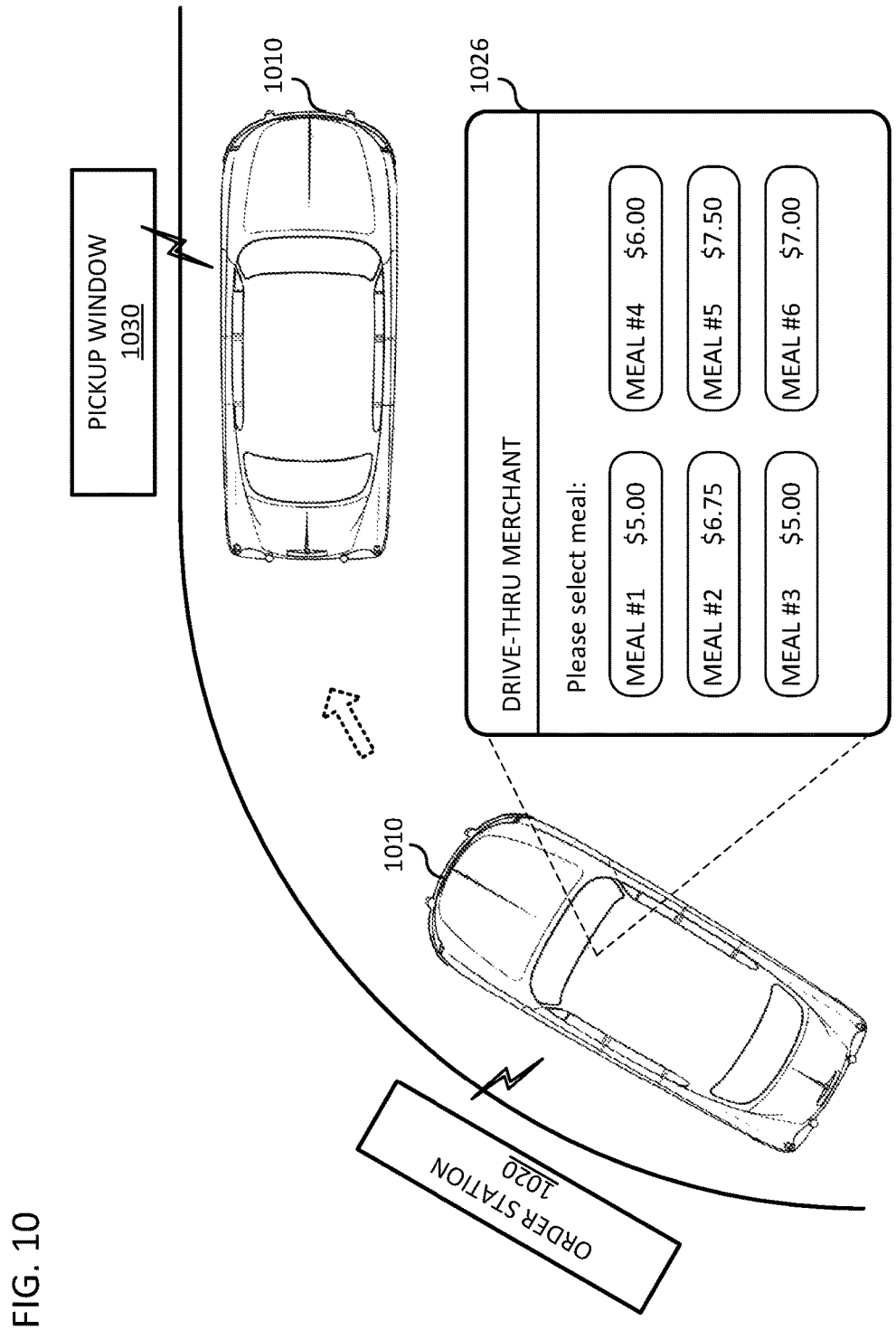
FIG. 10 illustrates another example of a scenario in which a proximity mode of an in-vehicle access application can be used, according to some embodiments.

FIG. 10 illustrates another example of a scenario in which the in-vehicle access application operating in proximity mode can be used to execute a transaction, according to some embodiments. In FIG. 10, a user operating vehicle 1010 enters a drive-thru restaurant to purchase a meal. The drive-thru restaurant may have an ordering station 1020 and a pickup window 1030. Ordering station 1020 may include a display that lists meal items offered by the restaurant, and in some embodiments, may include a microphone and speaker through which the user can communicate with a restaurant employee. Ordering station 1020 may also include an access device with one or more wireless transceivers that can communicate with the in-vehicle computing system of vehicle 1020.

As vehicle 1010 approaches the drive-thru restaurant, the vehicle's navigation subsystem recognizes that the location of vehicle 1010 coincides with or is nearby the location of the restaurant. Using the location of vehicle 1010, the in-vehicle access application may retrieve merchant information about the restaurant using similar techniques as those described. In some embodiments, the merchant information can be provided to the in-vehicle access application from ordering station 1020 using one or more short or near range wireless communication technologies. The merchant information may include, for example, menu items and associated prices offered by the restaurant. Based on this information, the in-vehicle access application may generate an ordering menu 1026 that can be displayed on the on the user interface (e.g., a touchscreen) of the in-vehicle computing system. For example, ordering menu 1026 may allow a user to select a particular meal as shown. Once a user has selected the meal items for purchase, the in-vehicle access application may transmit the meal selection to the access device of ordering station 1020 to place the order. By using the in-vehicle access application to place an order, the need to staff ordering station 1020 with a restaurant employee to take the order can be eliminated.

When vehicle 1010 proceeds to pickup window 1030, an access device at pickup window 1030 can transmit a transaction amount to the in-vehicle access application to request payment from the user. In some embodiments, the access device transmitting the transaction amount can be the same access device as the one that took the order. The in-vehicle access application may request the user to select a transaction method (e.g., transaction account) to complete the transaction. In some embodiments, the in-vehicle access application may require additional verification via a consumer verification method (e.g., PIN, password, biometric, etc.) to authenticate the transaction. Once the user has confirmed the transaction, transaction information including account credentials (e.g., PAN or token, transaction cryptogram, etc.) can be transmitted to the access device. In some embodiments, the location of vehicle 1020 may also be included in the transaction information. Upon receiving the transaction information, the access device may verify the user's account credentials and confirm the transaction. A restaurant employee at pickup window 1030 may then provide the user with the ordered meal.

Figure 11:
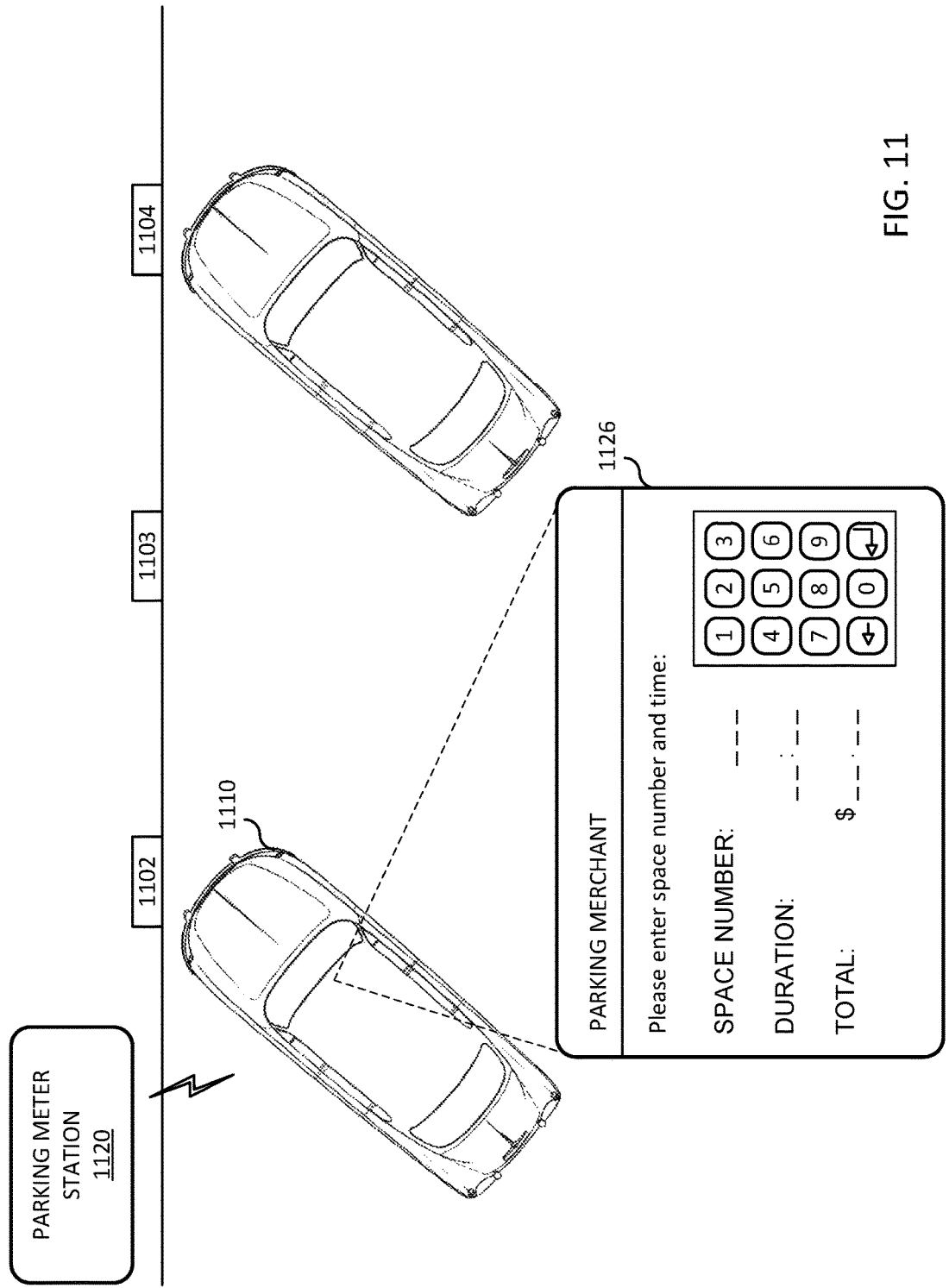
FIG. 11 illustrates a further example of a scenario in which a proximity mode of an in-vehicle access application can be used, according to some embodiments.

FIG. 11 illustrates a further example of a scenario in which the in-vehicle access application operating in proximity mode can be used to execute a transaction, according to some embodiments. In FIG. 11, a user operating vehicle 1110 parks vehicle 1110 in a parking area such as parking on the street, a parking lot, a parking garage, etc. The parking area may have a number of parking spaces including parking spaces 1102-1104. In some embodiments, the parking area may be unattended, and may include an automated parking meter station 1120 with an access device through which a user can deposit payment to purchase parking credits.

When vehicle 1110 arrives at the parking area, the vehicle's navigation subsystem may recognize that the location of vehicle 1110 coincides with or is nearby the location of the parking area. Using the location of vehicle 1110, the in-vehicle access application may retrieve merchant information about the parking area using similar techniques as those described. In some embodiments, the merchant information can be provided to the in-vehicle access application from parking meter station 1120 via one or more short or near range wireless communication technologies. The merchant information may include, for example, the number of spaces in the parking area and the monetary amount per time unit to park in the parking area.

Based on this information, the in-vehicle access application may generate a parking menu 1126 that can be displayed on the screen of the vehicle infosystem. For example, parking menu 1126 may allow the user to enter the parking space number and select the amount of time the user intends to park at this location. Once a user has entered the parking space number and the amount of time, the in-vehicle access application may request the user to select a transaction method (e.g., transaction account) to complete the transaction. In some embodiments, the in-vehicle access application may require additional verification via a consumer verification method (e.g., pin, password, biometric, etc.) to authenticate the transaction. Transaction information including account credentials (e.g., PAN or token, transaction cryptogram, etc.) as well as location information can be transmitted to parking meter station 1120 to purchase parking credits for vehicle 1110.

In some embodiments, for example, in the case of a parking garage, the system may allow a pre-authorization or hold of an estimated parking charge (e.g., to ensure the user's account has sufficient funds to cover the toll) with the actual transaction not being processed until the vehicle leaves the parking space or exits the garage. In some embodiments, when the in-vehicle access application is activated in the proximity mode when parking vehicle 1110, the in-vehicle access application may initiate a timer to record the duration of time that the vehicle is in the stopped position or parked. The duration of time can be communicated to the parking meter station or to a garage toll collector when vehicle 1110 leaves to indicate how long vehicle 1110 has been parked at that location. The parking meter station or garage toll collector can then compute the parking charge based on the actual amount of time that vehicle 1110 has been parked. In some embodiments, power to the timer can be maintained when the vehicle is turned off such the timer can continue to operate after the vehicle is off.

In the examples described above, a user is able to place an order for goods and/or services directly on in-vehicle computing system by providing the in-vehicle access application with information about the goods and services offered by a merchant. In some scenarios, such information may be unavailable, or the vehicle may not have network access to retrieve such information. In such scenarios, a user may order goods and/or services using conventional methods (e.g., by placing an order with a merchant employee). Nevertheless, the in-vehicle access application can still be used to conduct the payment portion of such a transaction. For example, after placing an order using conventional methods, an access device in proximity to the vehicle may transmit a transaction amount to the in-vehicle access application. The in-vehicle computing system can display the transaction amount and request authentication information (e.g., PIN, passcode, biometric data, etc.) from the user to complete the transaction. Once the user has provided the authentication information requested by the consumer verification method, the in-vehicle access application can send account credentials to the access device to complete the transaction.

Figure 12:
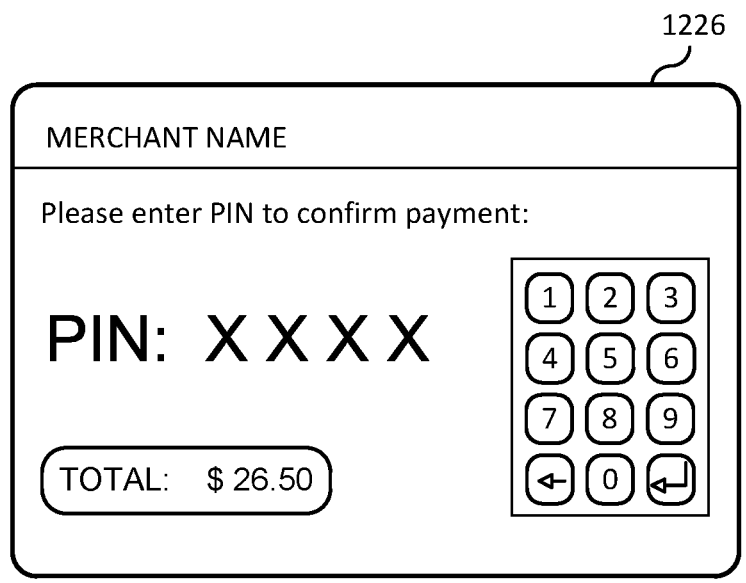
FIG. 12 illustrates an example of a customer verification method used by an in-vehicle access application, according to some embodiments.

FIG. 12 illustrates an example of a consumer verification method, according to some embodiments. In the example shown in FIG. 12, the in-vehicle access application may display a PIN entry menu 1226 on the user interface (e.g., touchscreen) of the in-vehicle computing system. PIN entry menu 1226 can be displayed after the user has placed an order with a merchant via the in-vehicle access application, or in response to receiving a transaction amount from an access device. For example, PIN entry menu 1226 may display the transaction amount and a keypad on a touchscreen that a user can engage with to enter the user's PIN. In some embodiments, a physical keypad or buttons that is part of the user interface of the in-vehicle computing system can also be used. Upon entry of the user's PIN, the in-vehicle access application may verify the user's PIN against the user's preregistered transaction method to authenticate the transaction.

Figure 13:
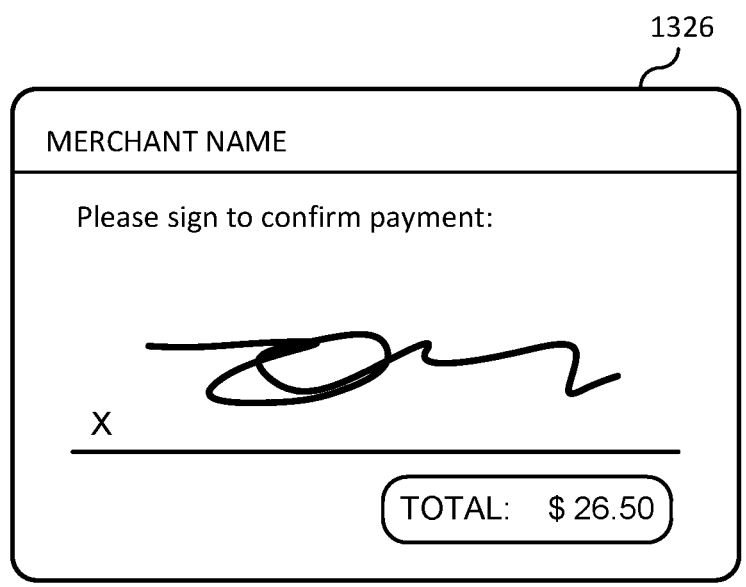
FIG. 13 illustrates another example of a customer verification method used by an in-vehicle access application, according to some embodiments.

FIG. 13 illustrates another example of a consumer verification method, according to some embodiments. In the example shown in FIG. 13, the in-vehicle access application may display a signature field that a user can sign, for example, with a finger or stylus to confirm or approve a transaction. Upon entry of the user's signature, the in-vehicle access application may verify the signature against a registered signature to authenticate the user for the transaction.

It should be understood that in some embodiments, other consumer verification methods such as entry of a passcode or biometric data (e.g., voice recognition, fingerprint, etc.) can be used. Furthermore, the in-vehicle access application can be configured to use different consumer verification methods for different transactions based on, for example, the particular merchant, types of goods or services being purchased, transaction amount, time, location, etc.

Figure 14:
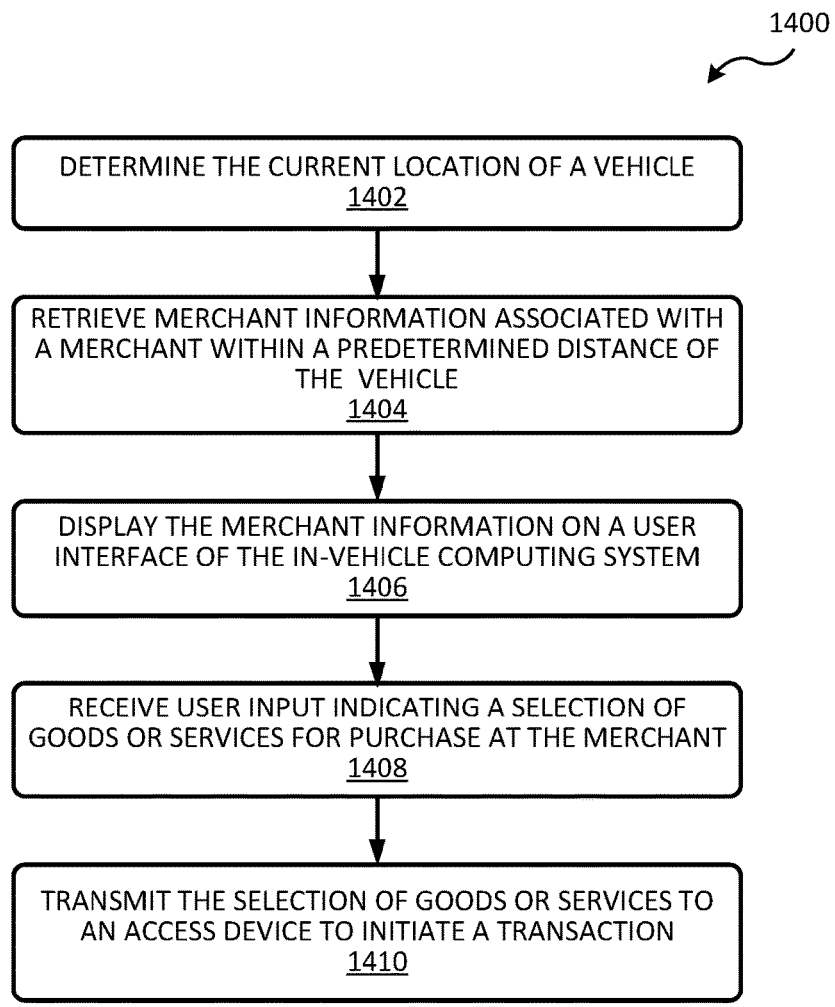
FIG. 14 illustrates a flow diagram of a process for initiating a transaction using a proximity mode of an in-vehicle access application, according to some embodiments.

FIG. 14 illustrates a flow diagram of a process 1400 for initiating a transaction using an in-vehicle access application operating in proximity mode, according to some embodiments. At block 1402, the current location of the vehicle is determined, for example, by a navigation subsystem of the vehicle. In some embodiments, a merchant at the location of or nearby the vehicle can be identified based on geo-fencing or location of the vehicle. For example, the identified merchant can be a merchant within a predetermined distance (e.g., 200 ft., 500 ft., etc.) of the vehicle. At block 1404, merchant information associated with the merchant is retrieved. The merchant information can be retrieved, for example, from a remote server, or from a merchant database accessible by the in-vehicle access application (e.g., the merchant database can be stored locally on the in-vehicle computing system).

At block 1406, the in-vehicle access application may display the retrieved merchant information (e.g., merchant name, location, point-of-sale terminal information, goods and/or services and associated prices offered by the merchant, etc.) on a user interface of the in-vehicle computing system. For example, the in-vehicle access application may generate a graphical user interface with the merchant information, and display the merchant information on the touchscreen of the in-vehicle computing system to allow a user to choose which goods and/or services to purchase. At block 1408, user input indicating a selection of goods and/or services for purchase at the merchant is received. At block 1410, the selection of goods and/or services is transmitted to the merchant or an access device associated with the merchant to initiate a transaction.

Figure 15:
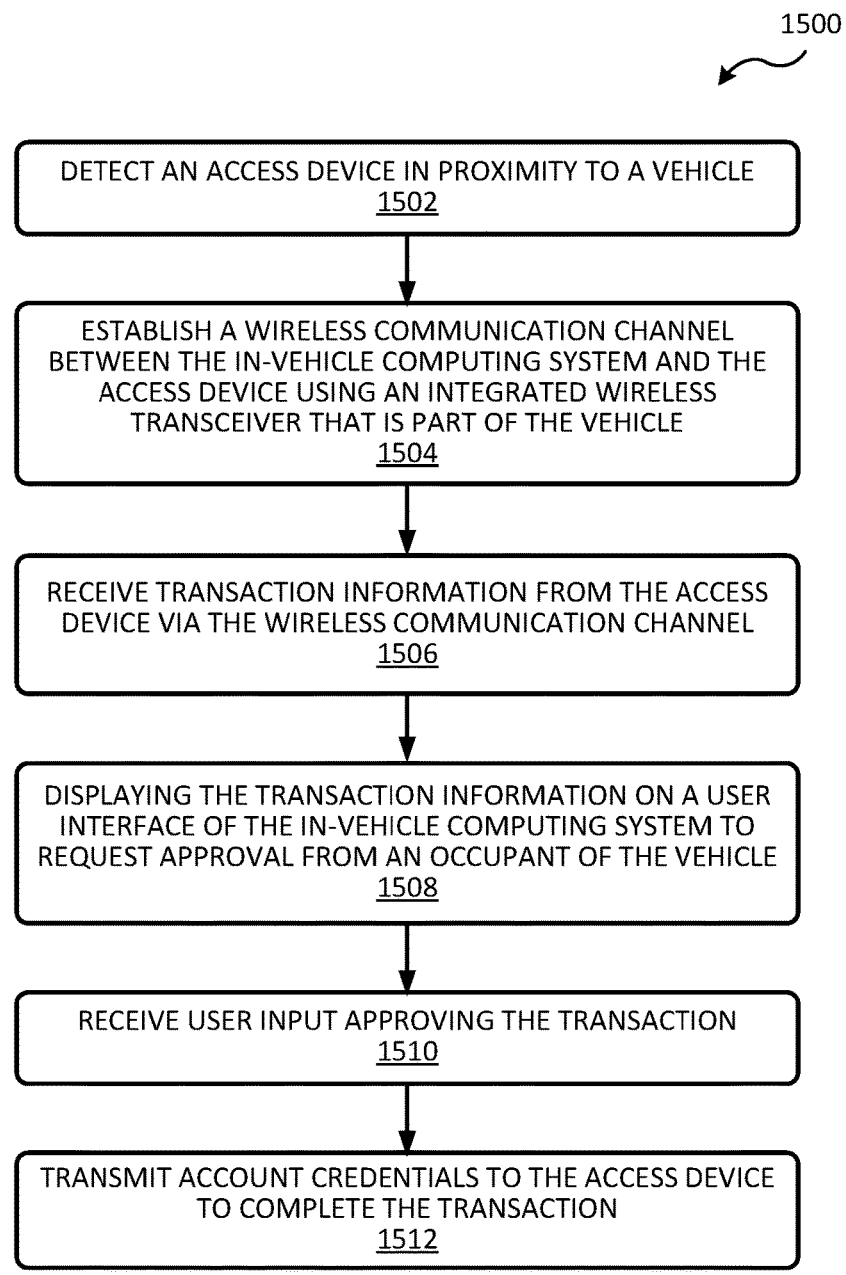
FIG. 15 illustrates a flow diagram of a process for executing a transaction using a proximity mode of an in-vehicle access application, according to some embodiments.

FIG. 15 illustrates a flow diagram of a process 1500 for conducting a transaction using an in-vehicle access application operating in proximity mode, according to some embodiments. At block 1502, the in-vehicle access application detects an access device in proximity to the vehicle, for example, by using geo-fencing or based on the location of the vehicle. Upon detecting the access device, at block 1504, the in-vehicle access application establishes a wireless communication channel between the in-vehicle computing system and the access device using an integrated wireless transceiver that is part of the vehicle. At block 1506, the in-vehicle access application receives transaction information (e.g., transaction amount) from the access device via the wireless communication channel.

At block 1508, the in-vehicle access application displays the transaction information on a user interface of the in-vehicle computing system to request approval from an occupant of the vehicle to execute the transaction and transmit account credentials to the access device. In some embodiments, the in-vehicle access application may request the occupant to select a transaction method (e.g., select a transaction account) from a list of registered transaction methods. At block 1510, the vehicle infosystem receives user input approving the transaction. In some embodiments, approval of the transaction can be performed via a consumer verification method, such as receiving user authentication data such as a PIN, passcode, signature, biometric data, etc. In some embodiments, a location-based authentication that compares the location of the vehicle and the location of the access device can also be performed. At block 1512, in-vehicle access application transmits account credentials (e.g., PAN or token, transaction cryptogram, etc.) to the access device to complete the transaction.

Any of the computing devices, communication devices, computers, servers, and the like described herein can be implemented using one or more processors coupled to a memory that store code or instructions, which when executed by the one or more processors, cause the device to perform one or more of the methods and processes described herein. Memory, storage media, and computer-readable media for containing code, or portions of code described herein, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A computing system comprising:
   a processor;
   a non-transitory computer readable medium coupled to the processor and storing a set of computer executable instructions, which when executed by the processor, causes the computing system to:
   receive a vehicle status signal of a vehicle;
   determine, based on a first state of the vehicle status signal at a first point in time, that the vehicle is in a stopped position;
   responsive to determining that the vehicle is in the stopped position, activate a proximity function of the computing system that detects an access device in proximity to the vehicle, and establishes a wireless communication channel between the computing system and the access device;
   determine, based on a second state of the vehicle status signal at a second point in time, that the vehicle is moving; and
   responsive to determining that the vehicle is moving, activate a tolling function of the computing system.

2. The computing system of claim 1, wherein the tolling function includes:
   identifying a toll road within a predetermined distance of the vehicle based on a location of the vehicle;
   determining that the vehicle is approaching the toll road; and
   transmitting account credentials to a remote tolling server to obtain permission for the vehicle to access the toll road prior to arrival of the vehicle at the toll road.

3. The computing system of claim 1, wherein the tolling function includes:
   identifying a toll station within a predetermined distance of the vehicle based on a location of the vehicle;
   determining a transponder frequency of the toll station;
   prior to arrival of the vehicle at the toll station, tuning a frequency of a tunable transponder integrated as part of the vehicle to match the determined transponder frequency of the toll station; and
   transmitting account credentials or verification information to the toll station using the determined transponder frequency when the toll station is in proximity to the vehicle.

4. The computing system of claim 3, wherein the tolling function includes determining a protocol message format associated with the toll station, and wherein the account credentials or the verification information are transmitted to the toll station using the determined protocol message format.

5. The computing system of claim 1, wherein the proximity function includes initiating a timer to record a duration of time that the vehicle is in the stopped position.

6. The computing system of claim 5, wherein power to the timer is maintained when the vehicle is turned off.

7. The computing system of claim 1, wherein the proximity function includes receiving transaction information from the access device via the wireless communication channel, and transmitting account credentials to the access device.

8. The computing system of claim 7, wherein the proximity function includes requesting entry of authentication information before transmitting the account credentials to the access device.

9. The computing system of claim 1, wherein the vehicle is determined to be in the stopped position when the vehicle status signal indicates that the vehicle has been motionless for over a threshold amount of time, or when the vehicle status signal indicates that a transmission mode of the vehicle is in park.

10. The computing system of claim 1, wherein the vehicle is determined to be in motion when the vehicle status signal indicates that the vehicle has reached a predetermined minimum speed, or when the vehicle status signal indicates that a transmission mode of the vehicle is in drive.

11. A method comprising:
receiving, by a computing system, a vehicle status signal of a vehicle;
determining, by the computing system based on a first state of the vehicle status signal at a first point in time, that the vehicle is in a stopped position;
responsive to determining that the vehicle is in the stopped position, activating a proximity function of the computing system that detects an access device in proximity to the vehicle, and establishes a wireless communication channel between the computing system and the access device;
determining, based on a second state of the vehicle status signal at a second point in time, that the vehicle is moving; and
responsive to determining that the vehicle is moving, activating a tolling function of the computing system.

12. The method of claim 11, wherein the tolling function includes:
identifying a toll road within a predetermined distance of the vehicle based on a location of the vehicle;
determining that the vehicle is approaching the toll road; and
transmitting account credentials to a remote tolling server to obtain permission for the vehicle to access the toll road prior to arrival of the vehicle at the toll road.

13. The method of claim 11, wherein the tolling function includes:
identifying a toll station within a predetermined distance of the vehicle based on a location of the vehicle;
determining a transponder frequency of the toll station;
prior to arrival of the vehicle at the toll station, tuning a frequency of a tunable transponder integrated as part of the vehicle to match the determined transponder frequency of the toll station; and
transmitting account credentials or verification information to the toll station using the determined transponder frequency when the toll station is in proximity to the vehicle.

14. The method of claim 13, wherein the tolling function includes determining a protocol message format associated with the toll station, and wherein the account credentials or the verification information are transmitted to the toll station using the determined protocol message format.

15. The method of claim 11, wherein the proximity function includes initiating a timer to record a duration of time that the vehicle is in the stopped position.

16. The method of claim 15, wherein power to the timer is maintained when the vehicle is turned off.

17. The method of claim 11, wherein the proximity function includes receiving transaction information from the access device via the wireless communication channel, and transmitting account credentials to the access device.

18. The method of claim 17, wherein the proximity function includes requesting entry of authentication information before transmitting the account credentials to the access device.

19. The method of claim 11, wherein the vehicle is determined to be in the stopped position when the vehicle status signal indicates that the vehicle has been motionless for over a threshold amount of time, or when the vehicle status signal indicates that a transmission mode of the vehicle is in park.

20. The method of claim 11, wherein the vehicle is determined to be in motion when the vehicle status signal indicates that the vehicle has reached a predetermined minimum speed, or when the vehicle status signal indicates that a transmission mode of the vehicle is in drive.

* * * * *